United States Patent
Goldner et al.

[11] Patent Number: 6,094,292
[45] Date of Patent: Jul. 25, 2000

[54] ELECTROCHROMIC WINDOW WITH HIGH REFLECTIVITY MODULATION

[75] Inventors: Ronald B. Goldner, Lexington; Alexandra Gerouki, Medford; Te-Yang Liu, Arlington; Mark A. Goldner, Cambridge; Terry E. Haas, Southborough, all of Mass.

[73] Assignee: Trustees of Tufts College, Medford, Mass.

[21] Appl. No.: 09/027,133

[22] Filed: Feb. 20, 1998

Related U.S. Application Data

[63] Continuation-in-part of application No. 08/951,085, Oct. 15, 1997.

[51] Int. Cl.[7] .............................. G02F 1/15; G02F 1/153; G02F 1/155; G02F 1/163
[52] U.S. Cl. .................... 359/265; 359/267; 359/269; 359/270; 359/273; 359/275; 427/523; 427/524; 427/529
[58] Field of Search .................... 427/523, 524, 427/529; 359/265, 267, 270, 273, 275, 269

[56] References Cited

U.S. PATENT DOCUMENTS

| | | | |
|---|---|---|---|
| 4,253,642 | 3/1981 | Morita | 359/365 |
| 4,832,463 | 5/1989 | Goldner et al. | 359/265 |
| 4,876,628 | 10/1989 | Goldner et al. | 361/313 |
| 4,878,743 | 11/1989 | Aikawa et al. | 359/365 |
| 4,887,414 | 12/1989 | Rauh et al. | 359/265 |
| 4,902,110 | 2/1990 | Green | 359/265 |
| 5,051,274 | 9/1991 | Goldner et al. | 427/38 |
| 5,133,594 | 7/1992 | Goldner et al. | 359/275 |
| 5,171,413 | 12/1992 | Arntz et al. | 204/192.15 |
| 5,189,550 | 2/1993 | Goldner et al. | 359/273 |
| 5,202,788 | 4/1993 | Weppner | 359/270 |
| 5,253,101 | 10/1993 | Demiryont | 359/273 |
| 5,338,625 | 8/1994 | Bates et al. | 429/193 |
| 5,445,906 | 8/1995 | Hobson et al. | 429/162 |
| 5,455,126 | 10/1995 | Bates et al. | 359/265 |
| 5,512,147 | 4/1996 | Bates et al. | 204/192.15 |
| 5,512,387 | 4/1996 | Ovshinsky | 429/152 |
| 5,532,869 | 7/1996 | Goldner et al. | 359/275 |
| 5,561,004 | 10/1996 | Bates et al. | 429/162 |
| 5,569,520 | 10/1996 | Bates | 429/162 |
| 5,597,660 | 1/1997 | Bates et al. | 429/191 |
| 5,612,152 | 3/1997 | Bates | 429/152 |

FOREIGN PATENT DOCUMENTS 8-236105  8/1996  Japan.

OTHER PUBLICATIONS

G. Wei, et al., "Thin films of lithium cobalt oxide", Solid State Ionics 58 (1992) 115–122.

(List continued on next page.)

Primary Examiner—Georgia Epps
Assistant Examiner—Margaret Burke
Attorney, Agent, or Firm—R. Dennis Creehan

[57] ABSTRACT

A multi-layered, active, thin film, solid-state electrochromic device having a high reflectivity in the near infrared in a colored state, a high reflectivity and transmissivity modulation when switching between colored and bleached states, a low absorptivity in the near infrared, and fast switching times, and methods for its manufacture and switching are provided. In one embodiment, a multi-layered device comprising a first indium tin oxide transparent electronic conductor, a transparent ion blocking layer, a tungsten oxide electrochromic anode, a lithium ion conducting-electrically resistive electrolyte, a complimentary lithium mixed metal oxide electrochromic cathode, a transparent ohmic contact layer, a second indium oxide transparent electronic conductor, and a silicon nitride encapsulant is provided. Through elimination of optional intermediate layers, simplified device designs are provided as alternative embodiments. Typical colored-state reflectivity of the multi-layered device is greater than 50% in the near infrared, bleached-state reflectivity is less than 40% in the visible, bleached-state transmissivity is greater than 60% in the near infrared and greater than 40% in the visible, and spectral absorbance is less than 50% in the range from 0.65–2.5 $\mu$m.

23 Claims, 26 Drawing Sheets

OTHER PUBLICATIONS

R.B. Goldner, et al., "Properties of a Carbon Negative Electrode in Completely Thin Film Li–Ion Batteries with a LiCoO2 Positive Electrode", Mat. Res. Soc. Symp. Proc., vol. 369, pp. 137–147, 1995.

A. Gerouki, et al., "Density of States Calculations of Small Diameter Single Graphene Sheets", J. Electrochem. Soc., vol. 143, No. 11, pp. L262–L263, Nov. 1996.

R.B. Goldner, et al., "Some lessons learned from research on a thin film electrochromic window", Solid State Ionics 70/71 (1994) 613–618.

R.B. Goldner, et al., "Reflectance Modulation with Electrochromic Li(x)WO3 Films", Proceedings Symp., vol. 90–2, pp. 14–23, Electrochem. Society (1989).

T. Haas, et al., "Fundamentals of Electrochromism in Metal Oxide Bronzes", SPIE Institute Series, vol. IS 4, pp. 170–180 (1988).

R.B. Goldner, et al., "Progress on the variable reflectivity electochromic window", Proc. SPIE 1536:34 (Jul. 1994).

R.B. Goldner, et al., "A monolithic thin–film electrochromic window", Solid State Ionics 53–56 (1992) 617–627.

R.B. Goldner, et al., "Development of a Thin Film Li(1–x)CoO2/Li(x)C6 Rocking–Chair Battery", Electrochemical Society Proceedings vol. 95–22, pp. 173–182 (1995).

R.B. Goldner, et al., "Electrochromic Materials for Controlled Radiant Energy Transfer in Buildings", Solar Energy Materials, v.11, n.3, pp. 177–185 (1984).

F.O. Arntz, et al., "Near–infared reflectance modulation with electrochromic crystalline WO3 films deposited on ambient temperature glass substrates by an oxygen ion–assisted technique", J. Appl. Phys. 67 (6), pp. 3177–3179, Mar. 15, 1990.

R.B. Goldner, et al., "High near–infared reflectivity modulation with polycrystalline electrochromic WO3 films", Appl. Phys. Lett. 43(12) pp. 1093–1095, Dec. 15, 1983.

R.B. Goldner, et al., "Optical Frequencies Free Electron Scattering Studies on Electrochromic Materials for Variable Reflectivity Windows", Solar Energy Materials v.12, pp. 403–410 (1985).

R.B. Goldner, et al., "Recent Research Related to the Development of Electrochromic Windows", Solar Energy Materials v.14, pp. 195–203 (1986).

K.K. Wong, et al., "Characterization technique for transparent ion conducting films", SPIE vol. 823, pp84–89 (1987).

G Wei, et al., "Lithium Cobalt Oxide Thin Films and its Electrochromism", Proc. Electrochemical Society, v.90, No. 2, pp 80–88 (1989).

R. Weiss, "Tufts Develops 'Smart Window' Glass", Lasers & Optronics, Aug. 1991, pp 21–22.

M.M. Thackeray, "Structural Considerations of Layered and Spinel Lithiated Oxides for Lithium Ion Batteries", J. Electrochem. Soc., vol. 142, No. 8, pp 2558–2563, Aug. 1995.

C. Julien and G. Nazri, Solid State Batteries: Materials Design and Optimization, Kluwer Academic Publishers (Boston 1994), pp. 146–153, pp. 378–397, pp. 472–489, pp. 579–601, pp. 608–619.

R.B. Goldner, et al., "Thin Film Solid State Ionic Materials for Electrochromic Smart Window (TM) Glass", Solid State Ionics 28–30: 1715–1721 (1988).

G. Seward, et al., "Prototype all–solid lithiated smart window devices", SPIE vol. 823, pp 90–100 (1987).

F.O. Arntz, et al., "Electrochromic Crystalline WO3 Films Prepared at Ambient Temperature by Ion Assisted Deposition", SPIE vol. 1149, pp. 40–45 (1989).

R.B. Goldner, et al., "Improved colored state reflectivity in lithiated WO3 films", SPIE vol. 823, pp. 101–105 (1987).

R.B. Goldner, et al., "Further Evidence for free electrons as dominating the behavior of electrochromic polycrystalline WO3 films", Appl. Phys. Lett. 47 (5), pp. 536–538, Sep. 1, 1985.

R.B. Goldner, "Attaining a solar energy economy with active thin film structures", J. Vac. Sci. Technol. A 13(3), pp. 1088–1094, May/Jun. 1995.

R.B. Goldner, et al., "Nuclear reaction analysis profiling as direct evidence for lithium ion mass transport in thin film 'rocking–chair structures", Appl. Phys. Lett. 62 (14), pp. 1699–1701, Apr. 5, 1993.

G. Berera, et al., "A Study of the Optical Band Gap of Lithium Tungsten Trioxide Thin Films", Mat. Res. Soc. Symp. Proc. vol. 210, pp. 69–74, 1991.

R.B. Goldner, et al., "A Transient Method for Measuring Diffusion Coefficients of Thin Film Battery Electrodes", J. Electrochem. Soc., vol. 143, No. 6, pp. L129–L130 (1996).

R.B. Goldner, et al., "Electrochromic behavior in ITO and related oxides", Applied Optics, v.24, No. 15, p. 2283, Aug. 1, 1985.

L.T. Kenny, et al., "The Preparation and Characterization of Lithium Cobalt Oxide Thin Films by LPCVD", Materials Research Soc. Symp. Proc., v.415, pp 213–217 (1996).

T.E. Hass, et al., "Preparation, Characterization and Electrochromism of Thin Film Lithium Cobalt Oxides", 18th Northeast Regional Meeting American Chemical Society, Jul. 31–Aug. 3, 1988, Program and Abstracts, Abstract No. 111, p 63 (1988).

Anonymous, "Researchers Develop 'Smart' Window to Cut Energy Consumption", The New York Times, C4, Sep. 29, 1982.

|   | FILM | THICKNESS (Å) |
|---|---|---|
| 9 | $Si_3N_4$ | 2000±500 |
| 8 | $In_2O_3$ | 1000±200 |
| 7 | TIN | 60±10 |
| 6 | $LiCoO_2$ | 1200±200 |
| 5 | LIPON | 15000±5000 |
| 4 | SODIATION |  |
| 3 | $WO_3$ | 1500±100 |
| 2 | SiC | 200±50 |
| 1 | ITO OR $In_2O_3$ | 3000±500 |

FIG. 10

|   | FILM | THICKNESS (Å) |
|---|---|---|
| 8 | $Si_3N_4$ | 2000±500 |
| 7 | $In_2O_3$ | 1000±200 |
| 6 | TiN | 60±10 |
| 5 | $LiCoO_2$ | 1200±200 |
| 4 | LIPON | 15000±5000 |
| 3 | $WO_3$ | 1500±100 |
| 2 | SiC | 200±50 |
| 1 | ITO OR $In_2O_3$ | 500±100 |

FIG. 12

|  | FILM | THICKNESS (Å) |
|---|---|---|
| 7 | $In_2O_3$ | 1000±200 |
| 6 | TiN | 60±10 |
| 5 | $LiCoO_2$ | 1200±100 |
| 4 | LIPON | 15000±5000 |
| 3 | SODIATION |  |
| 2 | $WO_3$ | 1600±100 |
| 1 | EDGE CONTACTS | 500±100 |

|   | FILM | THICKNESS (Å) |
|---|---|---|
| 6 | $In_2O_3$ | 1000 |
| 5 | LITHIATION |  |
| 4 | LIPON | 19000 |
| 3 | $WO_3$ | 1700 |
| 2 | SiC | 200 |
| 1 | ITO OR $In_2O_3$ | 2500 |

FIG. 16

ELECTROCHROMIC WINDOW WITH HIGH REFLECTIVITY MODULATION

CROSS-REFERENCE

This is a Continuation-In-Part of U.S. patent application Ser. No. 08/951,085, filed Oct. 15, 1997.

GOVERNMENT RIGHTS

The invention described herein was supported in part with U.S. Government funding under Department of Energy contracts DE-FG02-95ER14578 and DE-FG03-85SF15927. The U.S. Government has certain rights to this invention.

FIELD OF THE INVENTION

This invention relates to electrochromic devices and methods for their manufacture. More particularly, this invention relates to active, thin film, electrochromic devices having adjustable reflectivity and transmissivity, low absorptivity and rapid switching between colored and bleached states.

BACKGROUND OF THE INVENTION

It is generally known that the thermal management of buildings constitutes a substantial portion of the total annual United States energy expenditures. These costs primarily consist of maintaining desirable ambient conditions and through thermal management and include interior heating and cooling, interior lighting, and interior privacy. To reduce both building energy demands and costs, considerable progress has been made in the design and development of improved thermal insulation, window glazing, heating and cooling systems, and lighting. However, radiative and convective heat transfer losses through windows remains as a major source of energy costs in building thermal maintenance.

Conventional building window designs offer the advantage of a natural lighting source but have numerous thermal management limitations since they are poor thermal insulators and offer little privacy. Improvements in conventional window designs have been achieved through the use of double and triple glazed glass for thermal insulation. Exterior or interior devices such as awnings, blinds and drapes are also employed to regulate the amount of light and heat transmitted through windows or provide for interior privacy. Such auxiliary devices provide protection against interior heating from sunlight in hot summer months or insulate against radiative and convective heat loss from interiors during cold winter months. However, the use of such auxiliary devices for interior thermal management frequently conflict with interior lighting requirements and thus must be accompanied by additional interior light sources due to the associated loss of a natural lighting source. Regardless of thermal management considerations, such devices are also necessary for maintaining interior privacy.

Control of radiative heating and cooling in buildings is less straightforward. FIG. 1 shows the spectral distribution of the sun's irradiance at sea level. Three relevant wavelength regions are indicated in the ultraviolet, the visible, and the infrared. Most window glasses absorb ultraviolet radiation so this portion of the spectrum can be disregarded. The visible region is important for both natural lighting and privacy offered by building windows. The infrared region is important for both summer heating and winter cooling of buildings. Windows which are highly transmissive in the visible provide good natural light but poor privacy. Windows which are highly transmissive in the infrared provide undesirable heating in the summer months and cooling in the winter months. Thus, the lighting, privacy, and thermal management requirements for a window are not always compatible and vary with both the time of day and the season. Therefore, there is a real need for building windows whose optical properties can be varied to match ambient lighting and heating conditions and requirements.

It is well known that the transmissivity and reflectivity of transparent materials can be varied by modifying their light absorption and light reflection characteristics. Thus, passive thermal management methods, such as applications of thin metal, glass, ceramic or polymer coatings or anti-reflection coatings, have been developed for increasing or decreasing the infrared reflectivity of transparent window materials such as glasses, ceramics and plastics. Similarly, the light absorption characteristics of transparent materials can be modified by either application of high absorptivity coatings, introduction of compositional additives which increase the intrinsic absorptivity of a transparent material, or the introduction of particulates having a high refractive index to increase internal light scattering.

It is also generally known that applications of semi-transparent, optically reflective coatings reduce radiative heating and cooling by reducing the transmission of infrared radiation through windows. For example thin films of silver, gold, copper, tin or zinc oxide have been successfully employed to reflect or absorb a substantial portion of solar radiation. While conventional reflective coatings may be useful in reducing building cooling requirements during the summer and heating requirements during the winter, they typically produce a significant reduction in natural light transmission at visible wavelengths. In addition, these coatings generally do not provide for interior privacy and must be used with other devices such as blinds and drapes. An additional limitation of such reflective coatings is that they are passive films and windows utilizing such films are thus restricted to fixed reflection and transmission characteristics which cannot be adjusted to respond to climatic conditions or daily light cycles to meet interior heating and lighting requirements.

A major technical limitation of many conventional reflective coatings in building and vehicle window applications is that they tend to have a characteristic near infrared optical absorptivity which produce both a reduction in thermal transfer efficiency, due to secondary re-radiation from windows, and generates daily and seasonal thermal cycling from solar radiation absorption, resulting in cyclic thermal expansion stresses which can produce premature fatigue failure of the window glass [see R. Campbell, "Cracking Riddle of Hancock Windows", Boston Globe, Apr. 9, 1996]. To avoid such problems, it is necessary to identify optical materials whose near infrared solar radiation absorptivity is less than 50%.

More recently, methods have been developed which provide for variably adjusting the reflectivity and absorption characteristics of transparent materials. Active methods and devices have been developed which provide for optical switching between a dark, or colored, state and a transparent, or bleached state. These devices provide for adjusting the transmission characteristics of a transparent material to match the required lighting conditions.

For building and automobile applications, a spectrally selective transmission modulator must meet certain optical, mechanical, and chemical requirements. Optically, the visible transmission in the bleached state should be at least 70%, particularly in vehicle applications where adequate night vision is required for safety. The transmission in the colored state should be less than 5% to ensure privacy and security at night. The device must be free of visual defects such as discoloration and translucence. The device must have a low absorptivity to reduce heating and resultant thermal stresses induced by absorption of solar radiation. Additionally, the switching times between colored and bleached states must meet application requirements ranging from seconds for vehicles to minutes for buildings. Mechanically, the optically modulated window must be stable to large variations in temperature, repetitive thermal cycling and mechanical stresses induced by repetitive insertion and depletion of cations within the electrochromic material which produce volumetric changes in crystal lattices. Chemically, the device must be resistant to condensation, photochemical bleaching, and large variation in humidity.

One alternative to conventional passive coatings and auxiliary devices which meets these optical, mechanical and chemical requirements for thermal and visible radiation management has been the development of active electrochromic devices and windows. Electrochromic windows are large-area, multi-layered, thin film electronic devices whose optical properties can be modulated by application of an electric current at low voltages. These devices function as tunable band pass filters whose transmission response may be adjusted to match ambient light conditions and requirements. Such devices generally consist of multi-layered, thin film coatings applied to transparent substrates in which at least one thin film layer is comprised of an electrochromic material which is responsible for their optical property modulation. A device with such variable spectral selectivity can transmit or reflect a specific spectral region of solar radiation or thermal infrared radiation depending on the thermal and ambient light conditions and requirements.

The use of electrochromic devices which provide for modulation of reflectivity and transmissivity in transparent materials is particularly useful in applications involving architectural or building windows, vehicle windows or windshields, rear view mirrors, aviation visors and sunglasses, where adjustments in the optical properties of transparent materials are required to match diverse ambient lighting conditions.

Electrochromic devices and windows offer a number of distinct advantages over conventional methods for thermal radiation management. They provide for transmission of substantially all visible solar radiation but reflect substantially all of the thermal infrared radiation from either solar radiation or interior building radiation. They thus provide for reduction in cooling requirements in summer months and reduced heating requirements in winter months. In addition, they provide for adjustment of visible transmission through a window to match interior privacy needs to ambient light conditions. Due to their low optical absorptivity, electrochromic devices do not suffer from the same cyclic fatigue problem encountered with conventional passive coatings and have improved durability with daily and seasonal optical cycling. Prototype devices have been repetitively cycled between a colored and bleached state for tens of thousands of cycles with consistent and stable optical properties. An additional advantage of electrochromic devices is that they eliminate the need for auxiliary devices such as awnings, blinds, and drapes for thermal or light transmission management through building windows.

Electrochromic devices which demonstrate cyclic and reversible reflectivity modulation are known in the art. For example, see U.S. Pat. No. 4,889,414 to Rauh and Goldner, U.S. Pat. No. 4,902,110 to Green, U.S. Pat. No. 5,260,821 to Chu, et al, U.S. Pat. No. 5,202,788 to Weppner, et al, and U.S. Pat. No. 5,455,126 to Bates, et al. A cross-sectional schematic of a typical prior art device is shown in FIG. 2. A typical transmission and reflectivity spectra of a prior art device is shown in FIG. 3a and 3b. In general, a typical prior art device has a relative high transmission in the bleached state, close to 70%, a low colored-state transmission in the visible, less than 20%, and reasonable switching times. As shown by FIG. 3b, the reflectivity of a typical prior art device in the colored state is less than 50% with an undesirable high absorption in the near infrared. An additional undesirable limitation of prior art devices is a low transmission modulation in the infra-red with a typical reflectivity modulation of between 30 to 40%. In order for such electrochromic devices to gain widespread commercial acceptance in building and vehicle window applications, colored-state reflectivity of at least 60% and colored-state absorptivity of less than 50% in the near infrared are required with a reflectivity modulation of at least 50%.

In addition to non-optimum reflectance and absorption characteristics of current electrochromic devices, commercial applications of these devices are further hampered due to certain electronic, mechanical and fabrication limitations. Due to the complexity of design and fabrication methods with a multi-layered electrochromic device, electron and ion leakage or shorts limit the optical modulation and lifetime of current devices. Additionally, substantial mechanical stresses are induced due to lattice distortion from volumetric expansion and contraction associated with ion insertion and extraction from the anode and cathode layers. Furthermore, due to high temperature deposition methods used to fabricate these devices, thermally induced stresses generated during device processing typically cause cracking within and between device layers and lead to poor yields in manufacturing. Thus, innovative electrochromic device designs, thin film materials, and methods for fabricating the same are necessary for optimizing device performance and facilitating commercialization of electrochromic devices in window applications.

SUMMARY OF THE INVENTION

An object of the present invention is to provide an active thin film electrochromic device having a high reflectivity, low transmissivity, and low absorptivity at near infrared wavelengths in the colored state and a high transmissivity and low absorptivity at visible wavelengths in the bleached state.

An additional object of the present invention is to provide an active thin film electrochromic device having a high reflectivity modulation between colored and bleached states.

Another object of the present invention is to provide an improved method for manufacturing thin film electrochromic devices for high reflectivity modulation.

A further object of the present invention is to provide for an improved, optically transparent, ohmic contact which is useful in electrochromic devices.

Another object of the present invention is to provide for an electrochromic device which has improved switching speeds between colored and bleached states.

Yet another object of the present invention is to provide for an improved method for deposition of multiple thin film optical layers in fabricating an electrochromic device.

A further object of the present invention is to provide for innovative electrochromic device designs for reducing the number of thin film layers required in a multi-layered electrochromic device for enhanced manufacturing efficiency, economy and transmissivity.

A still further object of the present invention is to provide an electrochromic device which has a characteristic performance of a) A minimum colored-state reflectivity of 50% in the near infrared spectrum from 1 to 2.5 um; b) A minimum bleached-state transmissivity of 70% in the spectral range from 0.5 to 2.5 um; and c) A maximum colored-state transmissivity of 10% in the spectral range from 0.5 to 2.5 um.

A further object of the present invention is a single layer lithiated tungsten oxide film with a near infrared reflectivity of 75 to 80%.

A still further object of the present invention is a stoichiometric thin lithium cobalt oxide anode thin film having a bleached state transparency of at least 50%.

A further object of the present invention is a thin film deposition method for depositing fully dense electrochromic electrodes and electrolyte at deposition rates greater than 5 Å/sec.

An additional object of the present invention is to provide for a method for rapid uniform switching of large area electrochromic devices or electrochromic devices having transparent conducting layers with a relatively high lateral resistance

BRIEF DESCRIPTION OF THE DRAWINGS

This invention is pointed out with particularity in the appended claims. Other features and benefits of the present invention can be more clearly understood with reference to the specification and the accompanying drawings in which:

FIG. 10 is a schematic diagram of a the multi-layered device of Example 1;

FIG. 12 is a schematic diagram of a the multi-layered device of Example 2;

FIG. 16 is a schematic diagram of a the multi-layered device of Example 4; and

DESCRIPTION OF THE PREFERRED EMBODIMENTS

Electrochromic materials and devices have been developed as an alternative to passive coating methods for light and heat management in building and vehicle windows. These devices provide for the modulation of reflectivity and transmissivity in transparent materials to match ambient lighting conditions and requirements. In general, electrochromic materials are substances whose optical properties can be reversibly altered through application of an electric current. The optical modulation is the result of simultaneous insertion and extraction of electrons and charge compensating cations in the electrochromic material lattice.

Polycrystalline tungsten oxide (WO$_3$) with lithium as an insertion cation has been found to be a particularly useful electrochromic material for electrochromic device applications. For this material, a reversible oxidation-reduction process occurs through the following electrochemical reaction:

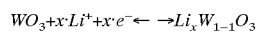

$$WO_3 + x \cdot Li^+ + x \cdot e^- \leftarrow \rightarrow Li_xW_{1-1}O_3$$

The forward reduction reaction produces a material optical change from a transparent state to dark blue coloration. The desired spectrally selective optical reflectivity can be achieved by modulating the density of free electrons in the material. To achieve such modulation, the WO$_3$ electrochromic material must be used as an anode in an electrochemical cell structure with a complementary dual cation and electron insertion material which acts as a cathode counter electrode.

Figure 1:
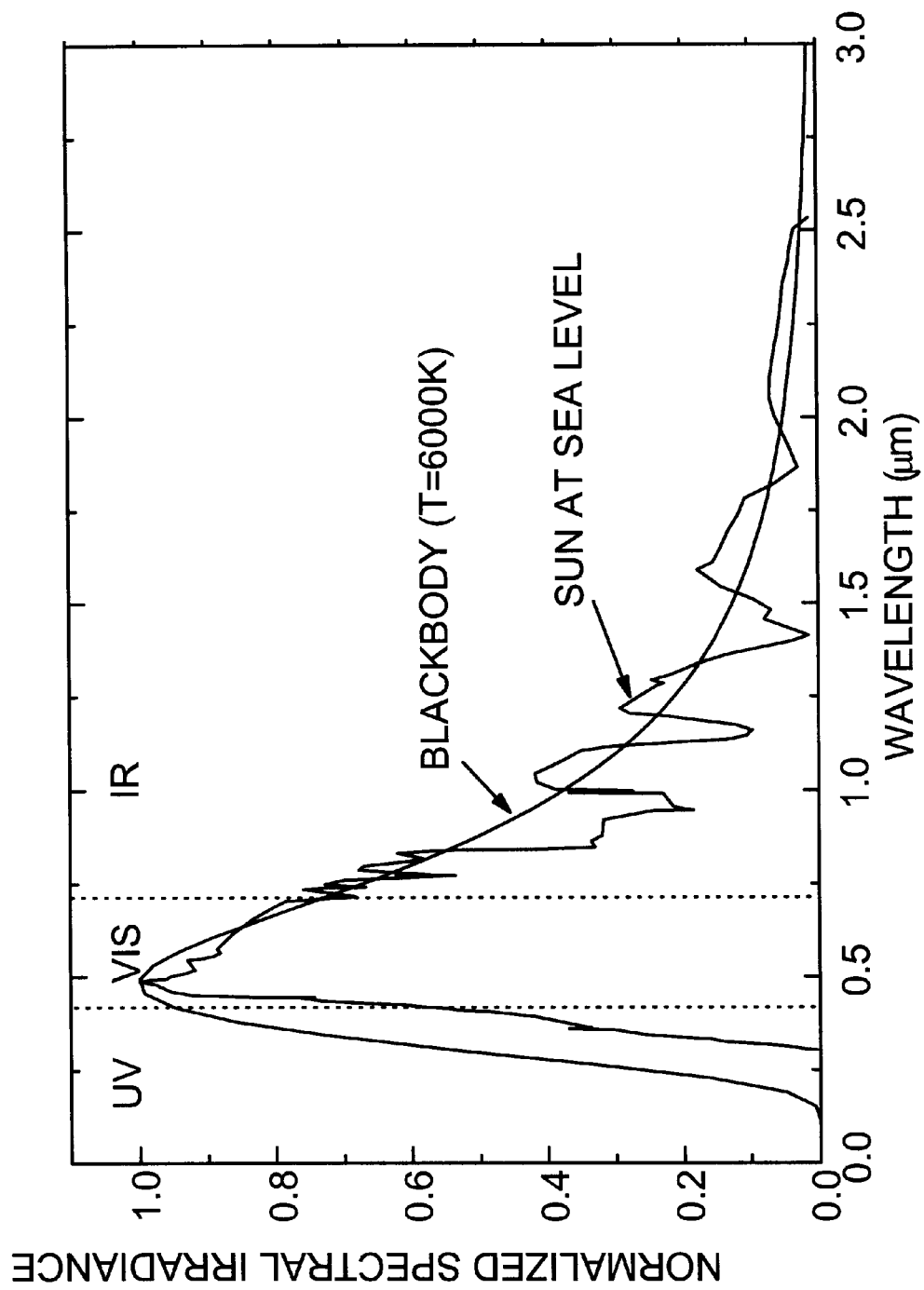
FIG. 1 shows a comparison of normalized spectral irradiance for a blackbody and the sun at sea level.
Figure 2:
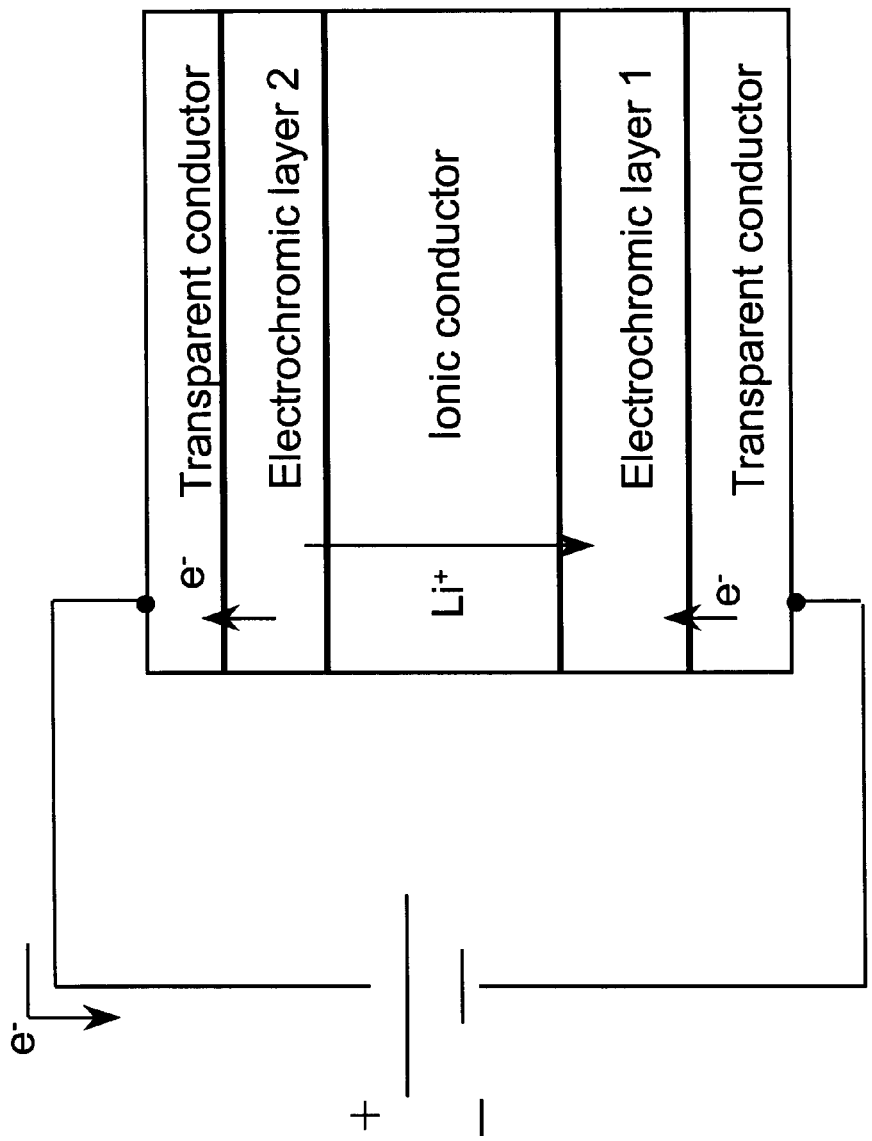
FIG. 2 is a schematic of a prior art thin film electrochromic device.
Figure 3A:
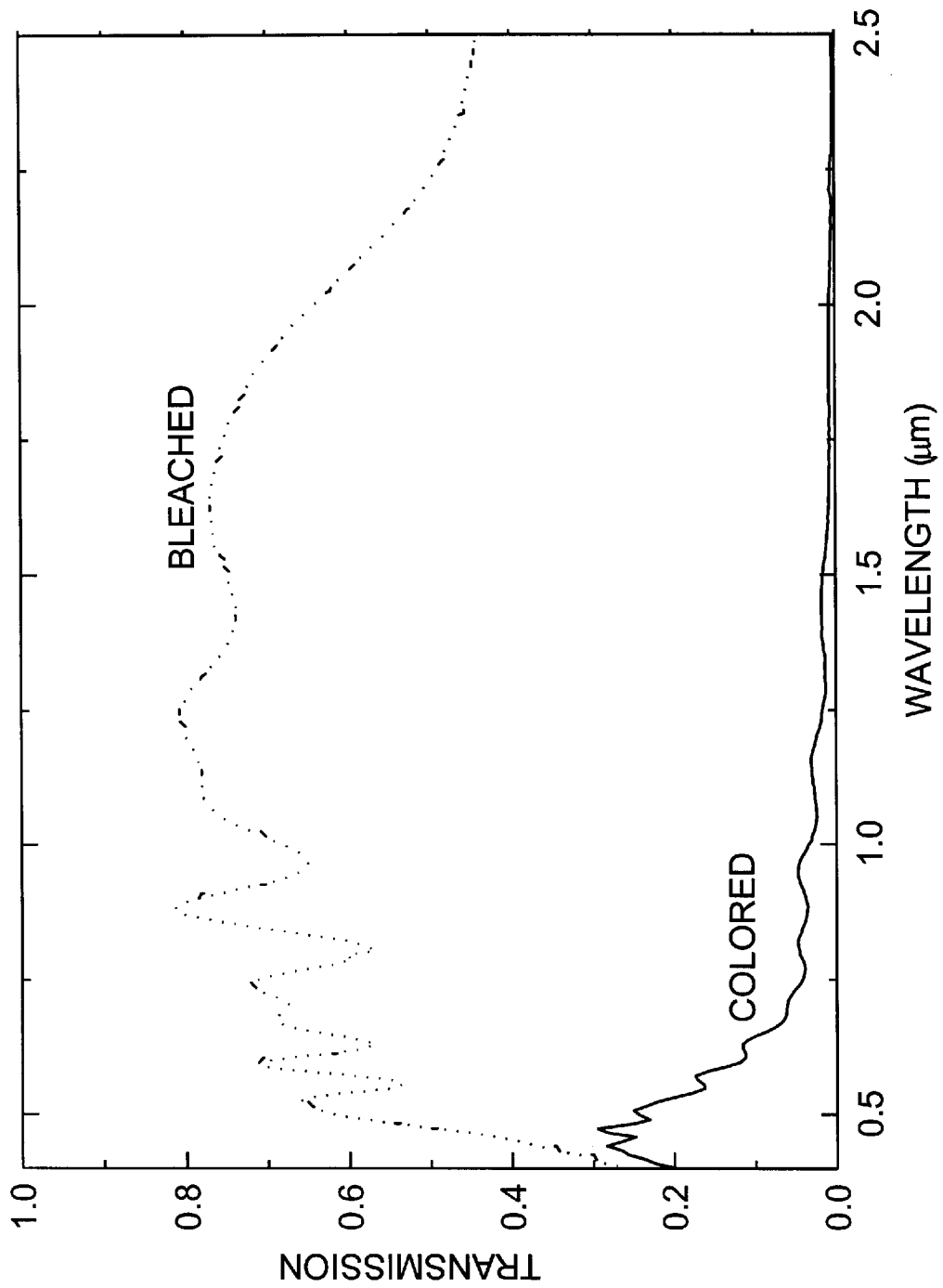
FIGS. 3a–b show typical transmission and reflectivity characteristics for a prior art electrochromic device shown schematically in FIG. 2.
Figure 3B:
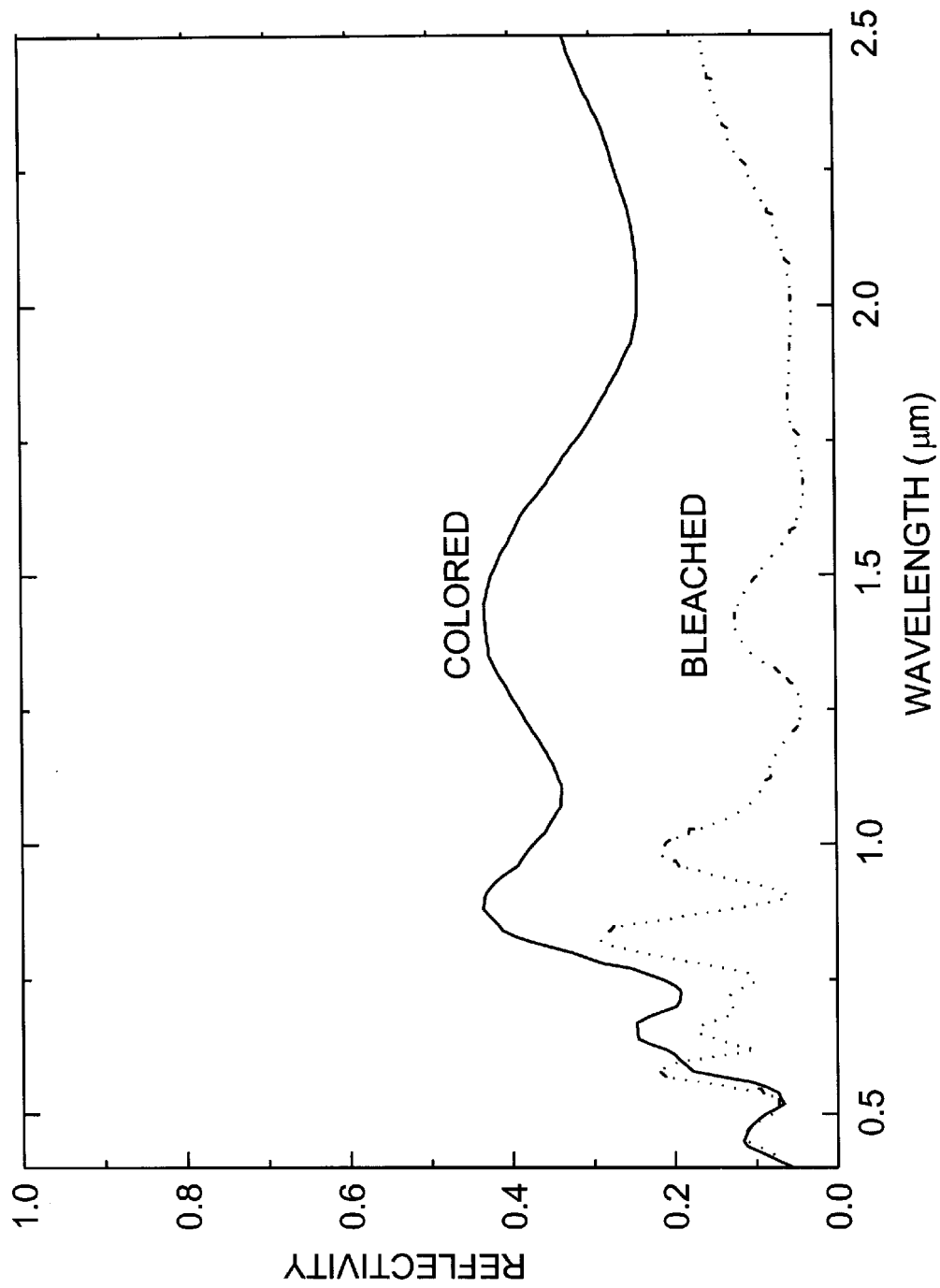
Figure 4:
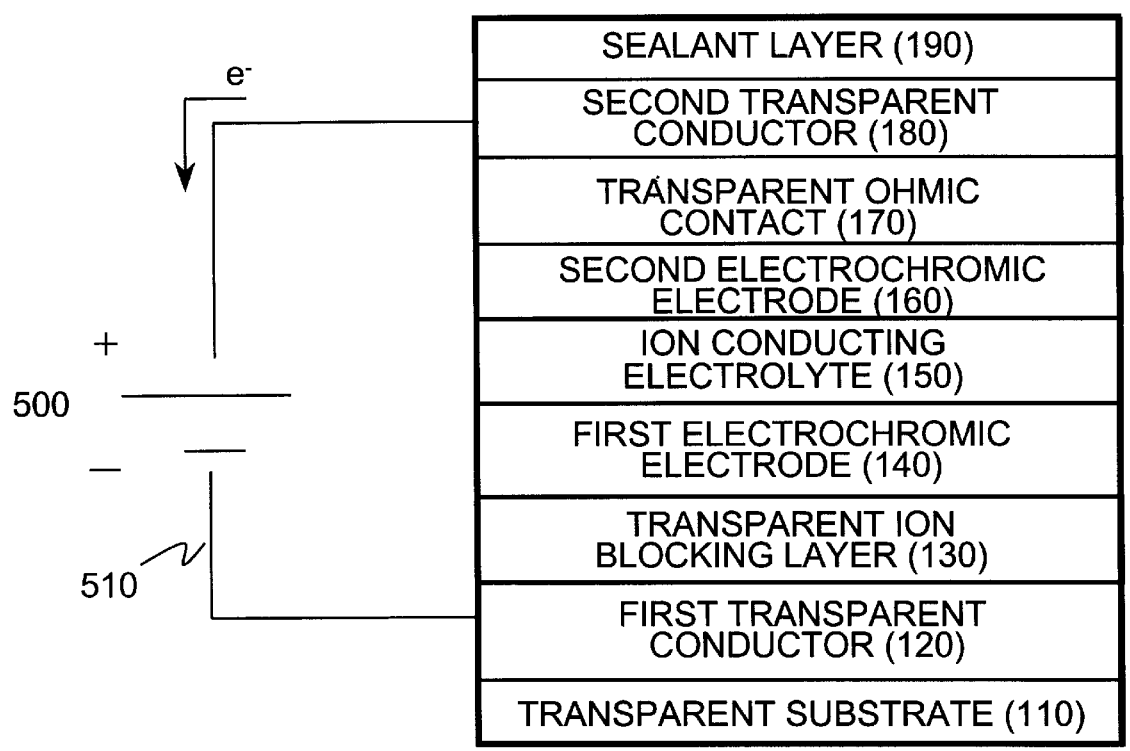
FIG. 4 is a schematic of a multi-layered, active thin film electrochromic device of the present invention.

One embodiment of the electrochromic device of the present invention is shown in FIG. 4. As shown by FIG. 4, the electrochromic anode 140 and cathode 160 materials are separated by an thin film electrolyte 150 that acts as an ionic conductor and is electronically resistive. A first and second transparent electronic conductor 120, 180 serve as electrical contacts for each electrode to an external current and voltage source 500. During a reduction or coloration cycle, electrons are transported by way of an external circuit 510 to the tungsten oxide anode 140 and lithium ions are transported to the layer from the cathode 160 by way of the electrolyte 150. Bleaching is achieved by changing the polarity of the external circuit 510. Since electrons and lithium ions are switched back and forth between the two electrochromic electrode layers 140, 160, the device is frequently referred to as a "rocking chair" device.

In the present invention, tungsten oxide (WO$_3$) is the preferred anode material 140 and either lithium cobalt oxide (LiCoO$_2$) or lithium titanium oxide (LiTiO$_2$) is the preferred cathode material 160. The preferred electrolyte materials 150 are either amorphous lithium phosphorus oxynitride (Li$_x$PO$_y$N$_z$) or lithium niobate (LiNbO$_3$). In one embodiment, indium tin oxide (ITO) is used as the first transparent electronic conductor 120 for the tungsten oxide anode layer and indium oxide (In$_2$O$_3$) 170 is used as the second transparent electronic conductor 180 for the lithium cobalt oxide anode layer 160. In one embodiment, a transparent ion blocking layer 130 is employed between the anode layer 140 and the first transparent conductor layer 120. In a preferred embodiment, a thin film layer of silicon nitride ($Si_3N_4$) is used as a packaging material 180 for sealing and protecting the device from ambient oxygen and humidity.

1. Electrochromic Device Materials

In selecting preferred materials for optical modulation of electrochromic films, both the Drude theory for free electrons and the Lorentz bound electron model [see G. Fowles, *Introduction to Modern Optics*, (Dover, N.Y. 1989; F. Wooten, *Optical Properties of Solids*, (Academic Press, New York) 1972; and J. C. Slater, *Quantum Theory of Molecules and Solids*, Vol. 3, (McGraw-Hill, New York) 1967.] have general utility due to the agreement of experimental data with theoretical models. The Drude-Lorentz model enables relating the optical characteristics of materials with free carrier concentration and, indirectly, to film structure. A high carrier concentration leads to a reflective or absorbing optical material depending on the extent of electron scattering. A low carrier concentration leads to a transparent material. Reflectivity or absorption modulation can be achieved by free carrier modulation and is the preferred basis for optical modulation of electrochromic layers.

It is generally known that the reflectivity and absorption of optical materials are dependent on their scattering parameter. The higher the scattering parameter, the lower the reflectivity due to an increase in absorption. For a low absorption application, it is necessary to use an electrochromic material with the least amount of scattering.

Transparent Substrates

Any suitable transparent substrate material may be utilized in the electrochromic device of the present invention. Tempered or untempered window glass, high silica glasses, optical glasses, specialty glasses, optically transparent ceramics and optically transparent polymers or plastics are suitable as substrate materials. In one embodiment, sodalime glass was utilized.

Transparent Electronic Conductors

Choice of materials having both sufficiently high free carrier density required for high conductivity and low optical loss is limited. A completely transparent electronic conductor is not possible since an incident optical electromagnetic wave will be dissipated by free charge carriers. Candidate materials which provide adequate optical transmission and conductivity are ultra thin metal films or semi-conducting oxide materials. For thin metallic films, the concentration of free carriers is difficult to control and optical transparency requires ultra thin film layers. Such ultra thin films are difficult to deposit uniformly due to film discontinuity which results in high resistivity. Since the concentration and mobility of free carriers in thin film semi-conducting oxides is dependent on both stoichiometry and impurities and defects which can be controlled in the deposition process, these materials are preferred as transparent electronic conductors. Preferred candidate materials include indium oxide, indium tin oxide, tin oxide, cadmium oxide and cadmium tin oxide, either undoped or doped with impurities such as tin, titanium, cadmium and phosphorus. Most preferably, indium oxide and indium tin oxide which are chemically reduced are utilized since these materials offer the highest transmission and conductivity properties.

Indium oxide transparent thin film conductors are typically deposited with an oxygen deficiency with the resultant oxygen vacancies contributing two electrons in the conduction band with other impurities contributing electron holes. These films typically have resistivities ranging between $3-4 \times 10^{-4}$ ohm-cm, carrier mobility of 40–70 $cm^2/V \cdot s$, a carrier concentration of $1-2 \times 10^{20}$, and index of refraction of approximately 2.

Indium tin oxide transparent thin films are typically grown with between 2 to 10% tin as a substitutional tetravalent impurity which contributes one electron to the conduction band. Substitutional tin and interstitial oxygen in the indium oxide lattice contribute to the carrier concentration. These films typically have resistivities ranging between $10^{-2}-10^{-3}$ ohm·cm, carrier mobilities ranging between 5–50 $cm^2/V \cdot s$, and an index of refraction of approximately 2. Typical transmissivities for 100 nm thin films of these materials is approximately 80% from the visible to near infrared range An additional requirement for the transparent electronic conductors is that they must be resistant to lithium ion insertion. Since the indium tin oxide layer is typically in direct contact with the $WO_3$ anode, any lithium which enters ITO will lower the density of free electrons in $WO_3$. One solution to this problems is the utilization of a silicon carbide ion blocking layer at the interface between ITO and $WO_3$. Since the indium oxide layer is typically in direct contact with the $LiCoO_2$ cathode, any lithium which migrates to the $In_2O_3$ layer may be lost by oxidation of the lithium at the $In_2O_3$-air interface. One solution to this problem is the utilization of a very thin film of titanium nitride as an ion blocking layer at the $LiCoO_2$ cathode-$In_2O_3$ conductor interface. Additionally, air oxidation may be prevented by application of an encapsulation or sealing layer to the exterior $In_2O_3$ surface.

Lithium Ion Blocking Layer for Anode

In order to reduce lithium migration from the $WO_3$ anode layer to the ITO transparent conductor layer and resultant reduction of ITO by $Li^+$ with corresponding loss in reflectivity in the bleached state, a transparent, electronically conductive, ion blocking layer may be used. Silicon carbide thin films have been shown to be particularly useful for this purpose due to the low mobility and diffusivity of Li+ in the silicon carbide lattice.

The optical properties of silicon carbide thin films are strongly dependent on the deposition process and parameters due to variations in the structure of the deposit. Use of commercial silicon carbide sputtered targets typically produces p-type thin films which exhibit junction effects, such as inhibited electron transport. To overcome this problem, lithium doping of silicon carbide thin films creates n-type films and resistivities less than one ohm·cm. The effectiveness of the use of a silicon carbide lithium blocking layer between $WO_3$ and ITO has been demonstrated in devices which show no reduction in transmission modulation after 18,000 cycles. Devices fabricated without such an ion blocking layer exhibit a rapid decrease in transmission modulation after a limited number of cycles.

Electrochromic Anode

From consideration of Drude-Lorentz models, the maximum reflectivity modulation is obtained with electrochromic materials having relatively low mass conduction band, bound electron dielectric response, and scattering parameter. These requirements are readily met with polycrystalline $WO_3$ which has been shown to be the only known electrochromic material capable of providing a high degree of reflectivity modulation [see R. Goldner, et al, Solar Energy Materials and Solar Cells, 32:421–428 (1994).

Polycrystalline $WO_3$ is a preferred electrochromic material due to its characteristically low scattering behavior compared to amorphous $WO_3$ and other candidate materials. During coloration of $WO_3$, it is assumed that the electrons inserted from the lower transparent conductor are delocalized in the conduction band while the inserted $Li^+$ ions occupy interstitial sites. Thus, the coloration is due to free electron absorption as is the case with metals and predicted by the Drude model. The contributions from the bound electrons can be added by the Lorentz model.

An additional advantage of polycrystalline $WO_3$ is the open structure of its slightly distorted $ReO_3$ lattice which enables insertion of small cations such as $H^+$, $Li^+$, and $Na^+$. Lithium is a preferred insertion material due to the high diffusivity of the cation through the lattice. By additions of small amounts of sodium ion to the lattice, a monoclinic to cubic structural transformation occurs with a corresponding lattice expansion which, in turn, provides stress compensation to the stress induced by lithium insertion. As a direct result, the amount of lithium ion that can be inserted increases and the mobility of lithium is also increased, leading to faster switching times and lower voltage requirements when switching between colored and bleached states.

RF-sputtered, polycrystalline $WO_3$ has a monoclinic structure with c-axes generally perpendicular to the plane of the substrate. TEM measurements on such sputtered films indicates crystallite sizes ranging from 5 to 30 nm with a peak size distribution close to 30 nm. Lithium insertion has been shown to cause a monoclinic to cubic transformation with a resulting change in scattering energy from 1 eV to 0.45 eV for 0.5 molar lithium insertion. A maximum reflectivity modulation of 80% has been observed with lithiated $WO_3$.

The reflectivity of an optical material is largely dependent on the extent of electron scattering. Reflectivity is thus influenced by scattering due to grain boundaries and lattice disorder in sputtered polycrystalline thin films. It has also been shown that oxygen deficiency in sputter deposited thin films lead to extended defects such as lattice shear planes which significantly enhance scattering [see R. B. Goldner, et al, Solar Energy Mater., 12:403 (1985)]. Thus, the deposition parameters and deposition method have a significant impact on $WO_3$ cathode properties. In the most preferred embodiment, this thin film cathode is deposited by an ion-assisted evaporation method which is capable of producing a nearly theoretical density film at high deposition rates.

In one embodiment, the $WO_3$ film is doped with sodium ion to achieve certain advantages. Sodiation of the $WO_3$ lattice produces a decrease in the bound electron scattering parameter and correspondingly higher screened plasma frequency, and an increase in the plasma energy. Due to a distortion in the $WO_3$ from sodium ion insertion, sodiation of the lattice appears to increase the solubility of lithium in the $WO_3$ lattice. The insertion of sodium with lithium thus leads to both a beneficial reduction in ion insertion induced stress in the $WO_3$ lattice as well as a corresponding increase in free electron insertion where insertion of x mols of lithium and y mols of sodium permits insertion of up to x+y mols of electrons. Electrochromic devices produced with sodiated $WO_3$ exhibit a characteristically high reflectivity in the colored state.

Lithium Ion Conducting Electrolyte

A primary requirement of the electrolyte is that it serves as an efficient ionic conductor with essentially no electronic conductivity. Additionally, the electrolyte must be stable to long-term exposures to solar radiation, large changes in ambient temperatures, repetitive thermal and potential cycling, and overvoltages.

Preferred electrolytes should be free of electronic shorts and possess a characteristically high breakdown voltage. Electronic leaks increase the effective electronic conductivity of the electrolyte and thereby reduce the efficiency of ionic transport between the cathode and anode. The integrity of the electrolyte should be preserved over the anticipated range of voltages used in switching the electrochromic device and charging the electrochemical cell. For a device comprised of a $WO_3$ anode and a $LiCoO_2$ cathode, this range should be at least ±2 Volts, the difference between Fermi levels for the two materials. The combination of electrolyte ionic conductivity with the respective ionic diffusivities of the two electrochromic electrodes determines the overall ionic mobility and influences the switching times for any given device.

While organic polymer electrolytes typically offer higher ion conductivity than inorganic electrolytes, they are less stable to long-term exposure to solar radiation. In addition, polymer electrolytes are known to be unstable at voltages in excess of 5 Volts, forming resistive interfaces which significantly lowers their ionic conductivity. For these reasons, inorganic electrolytes are preferred due to their durability and greater stability.

Since the electrochromic device of the present invention is based on lithium electrochemistry, a number of inorganic lithium electrolytes are potential candidate materials. These include, but are not limited to, lithium phosphorus oxynitride (commonly referred to as LiPON), lithium niobate, lithium aluminum silicate and lithium silicon oxynitride. In one embodiment, $LiNbO_3$ is utilized. However, due to the relatively low effective electronic resistivity of this ionic conductor, less than $10^{10}$ ohm·cm, the electronic conductivity of this ionic conductor is higher than is optimum for the electrolyte. For satisfactory performance of this electrolyte material, electronic barrier layers having sufficient ionic conductivity must be utilized.

In a preferred embodiment, an amorphous thin film of lithium phosphorus oxynitride ($Li_xPO_yN_z$) is utilized as the electrolyte material. This electrolyte has been shown to have general utility in thin film lithium battery applications and sputtered films of this material have a typical stoichiometry of $Li_{3.3}PO_{3.8}NO_{0.22}$ [see Bates, et al, Solid State Ionics, 53–56:647 (1992) and J.Electrochemical Soc., 144(2) 524 (1997)]. The electronic resistivity of this electrolyte is greater than $10^{14}$ ohm·cm and the ionic conductivity is approximately $2 \times 10^{-6}$ S/cm at 25° C., increasing with nitrogen content. The electrochemical stability of this electrolyte in a multi-layered electrochromic device is relatively high with a breakdown voltage of 5.5 Volts.

The stability and integrity of thin films of LiPON electrolyte material are strongly dependent on film density. Thus, the deposition parameters and deposition method have a significant impact on thin film electrolyte properties. In the most preferred embodiment, the thin film LiPON electrolyte is deposited by the ion-assisted thermal evaporation method of the present invention which produces a nearly theoretically dense film with a density of 2.4 g/cm³. By comparison, measured densities of LiPON films made by traditional sputtering methods range between 1.6 and 1.8 g/cm³ and are significantly lower than the theoretical LiPON density. The ion-assisted deposition process generally produces high yields of electrolyte films which are free of electron leaks, have electronic resistivities greater than $10^{13}$ ohm·cm and an ionic conductivity of approximately $10^{-6}$ S/cm. The breakdown voltage of these electrolyte films exceeded 10 Volts.

Electrochromic Cathode

A complementary electrochromic cathode layer is used in conjunction with the $WO_3$ anode as a counter electrode. Preferably, this material is a mixed ionic-electronic conductor, provides for non-stoichiometric compositions for lithium ion insertion, has unfilled lattice sites in the oxidized state which are reversibly filled in the reduced state, and has a high ionic diffusivity with relatively low activation energy for diffusion. Additionally, the optical modulation of the cathode should be complementary to that of the $WO_3$ anode so that the cathode is transparent in the reduced or lithiated state and colored in the oxidized state or lithium depleted state.

Preferred cathode materials have an intrinsically high, reversible lithium extraction efficiency after repetitive device coloring(charge)-bleaching(discharge) cycles. The lithium extraction efficiency is measured by combining coulomb counting measurements, during device charging at a fixed current for a fixed time, with cathode film density measurements. The extraction efficiency (y %) is reported as the total charge count ($\Delta Q = I \times t$), which is due to lithium adsorption/reduction by the cathode material, divided by the moles of cathode material [$M_{Cathode}$], or $$y\ \% = 100 \times (\Delta Q / ((1.6 \times 10^{-19} q/e^-) \times [M_{Cathode}]))$$

where, $$[M_{cathode}] = (\text{Cathode Volume} \times \text{Cathode Density} \times NA)/(\text{Cathode M.W.})$$

and NA is Avogadro's Number, Cathode M.W. is the molecular weight of the cathode material, and cathode film volume and film densities are calculated from measurements made with an Inficon IC6000 quartz crystal oscillator and a Surfanalyzer 150 profilometer.

Lithiated metal oxides and lithiated mixed oxides of cobalt, nickel, titanium, chromium and vanadium, tin oxide, indium oxide, indium tin oxide and tin oxide amorphous glasses have been shown to be particularly useful as lithium insertion materials used as cathodes. In a preferred embodiment, a sputtered thin film of lithium cobalt oxide is utilized as the cathode 160. In a preferred embodiment, this cathode 160 exhibits a reversible lithium extraction efficiency (y %) of at least eighty percent after at least 400 device recharging cycles. The relative film thickness of the anode and cathode layers may be adjusted to balance the overall charge capacity of the battery. In the most preferred embodiment, the cathode 160 exhibits an eighty percent extraction efficiency after 20,000 cycles.

Figure 5:
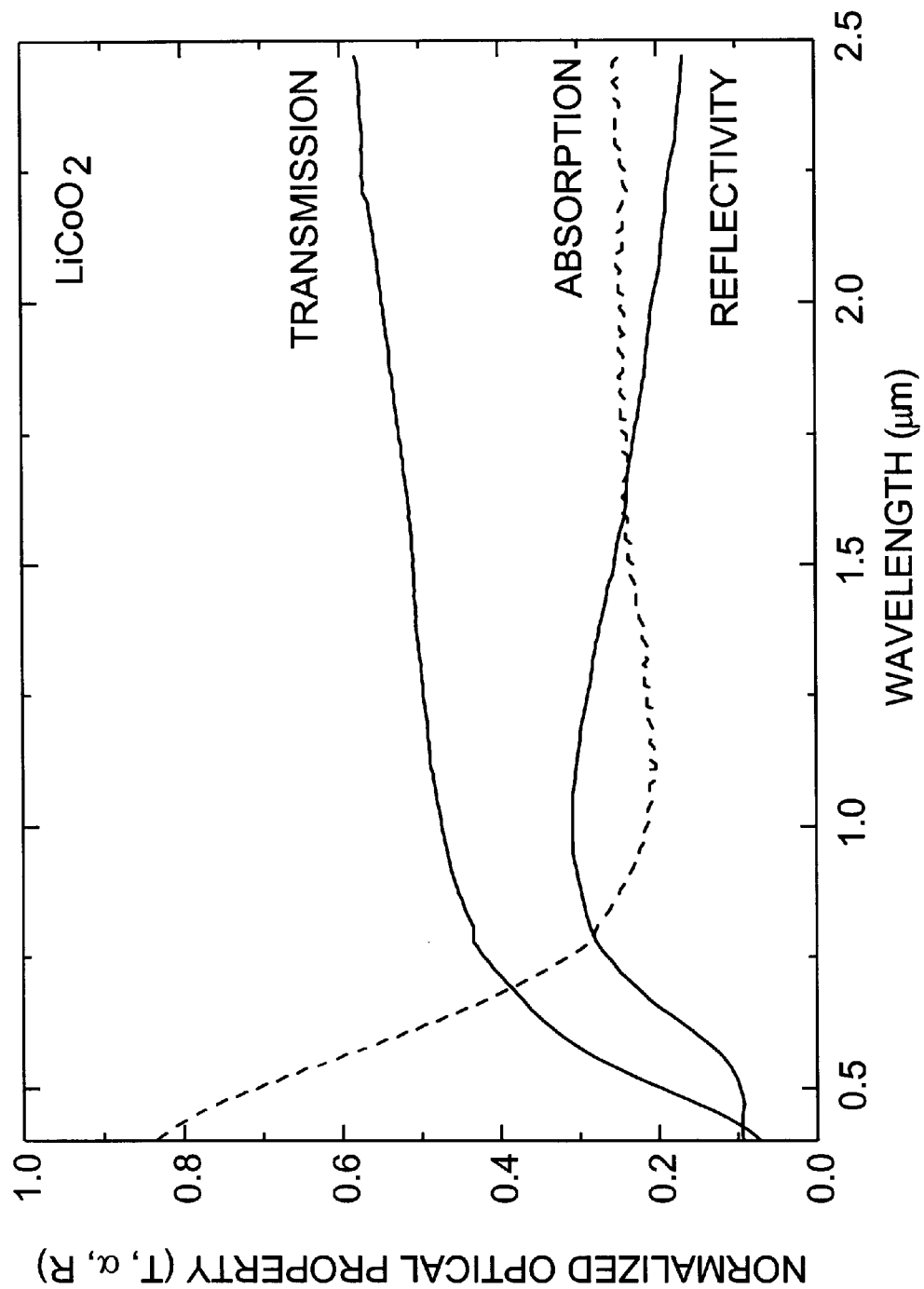
FIG. 5 shows typical optical properties of a LiCoO$_2$ thin film cathode of the present invention.

Lithium cobalt oxide has the additional unique characteristic of being a transition metal oxide that is optically transparent over a broad range of the solar spectrum. The mixed oxide has a layered structure that supports intercalation with $Li^+$ ions and is useful as an anode in lithium batteries. RF-sputtered thin films of this material are typically polycrystalline and non-stoichiometric. The lattice structure supports extraction and insertion of significant amounts of lithium during device switching cycles. Switching between colored and bleached states is enhanced by the relatively fast diffusivity of lithium in the mixed oxide lattice, as high as $5 \times 10^{-8}$ cm$^2$/s. Furthermore, when fully lithiated and close to stoichiometry, lithium cobalt oxide thin films are transparent, whereas, when depleted of lithium, the material colors and darkens. Thus, the optical modulation of this cathode material behaves in a complementary manner to the $WO_3$ anode. FIG. 5 shows the characteristic optical properties of a 120 nm thin film of partially lithiated $LiCoO_2$.

Ohmic Contact Layer for Cathode

Since $LiCoO_2$ is an anodically coloring electrochromic material or a p-type semiconductor and $In_2O_3$ is a degenerate n-type semiconductor, a p-n heterojunction is formed at the interface between these materials. Once formed, the heterojunction blocks the flow of electrons between the two layers and prevents coloring of the electrochromic device. Blocking becomes worse as coloring progresses since $LiCoO_2$ becomes more p-type with electron extraction. This results in an electrochromic device which initially colors and remains partially colored since no additional lithium ion transfer after electron flow subsides. In a preferred embodiment, this blocking problem is remedied by application of a thin metallic or semi-metallic layer between these two layers. Any stable, oxidation resistant, optically transparent, metallic or semi-metallic conductor can be utilized as an ohmic contact layer. For example, transition metal nitrides, such as titanium nitride, zirconium nitride, and hafnium nitride are particularly useful. In a preferred embodiment, a 60–100 Å sputter-deposited titanium nitride film is applied. TiN is preferred since it is stable to oxidation, adheres well to other layers, is optically transparent as a thin film and is an effective ion blocking layer for preventing lithium transport between the $LiCoO_2$ and $In_2O_3$ layers.

Optional Encapsulating Layer

The electrochromic device may be sealed or encapsulated with an organic or inorganic packaging material to prevent degradation of cell components or cell operation from exposure to atmospheric moisture or oxygen. Where a $In_2O_3$ transparent conductor surface is exposed to air, a sealant is particularly useful to prevent oxidation loss of lithium which migrates to the $In_2O_3$-air interface. Unsealed electrochromic devices which are exposed to atmospheric oxygen and humidity during repetitive atmospheric cycling have exhibited a gradual degradation in optical properties due to lithium atmospheric oxidation. The use of a packaging material may also provide protection of device components from mechanical or thermal stress originating from the surrounding environment. In a preferred embodiment, a nominally 2000 Å thick film of silicon nitride is sputter deposited to seal the surface of the $In_2O_3$ layer from atmospheric oxygen and humidity. Any other suitable packaging materials may be utilized which are optically transparent and create barriers to water vapor and oxygen exposure. For example, a variety of thin films or coatings of metals, ceramics, glasses, and polymers, which can be applied as an impervious overlay barrier without disrupting device components or optical transmissivity, would be particularly useful.

2. Electrochromic Device

A schematic cross-sectional view of a five layer electrochromic device 100 of the present invention is shown in FIG. 4. A transparent substrate 110 provides support for the device 100 and protection from external ambient climatic conditions.

In one embodiment, a transparent conductor 120 is deposited on the substrate 110 for electrical contact with an external voltage source 500. In one preferred embodiment the transparent conductor 120 is a nominally 500–3000 Å thick coating of indium oxide. In another preferred embodiment, a nominally 500–3000 Å thick film of indium tin oxide (ITO) is utilized. In a most preferred embodiment, a 500 Å thick film of ITO is used as the transparent conductor 120.

An optically transparent, electronically conductive, ion blocking layer 130 may optionally be deposited on the transparent conductor 120. In one embodiment, a nominally 200–500 Å thick silicon carbide film is deposited on the transparent conductor 120 as an ion blocking layer 130. In a preferred embodiment, a 200–300 Å thick film of silicon carbide is utilized.

An electrochromic anode material 140 is deposited on the ion blocking layer 130, or alternatively, on the transparent conductor layer 120 when no ion blocking layer 130 is used. In one embodiment, a nominally 1000–2000 Å thick tungsten oxide $WO_3$ film is deposited as the electrochromic anode 140. In a preferred embodiment, a 1000–1600 Å thick layer of $WO_3$ is deposited as the anode 140. Following deposition, the $WO_3$ anode film 140 may be optionally doped with sodium to improve optical reflectivity.

An ionically conductive, electronically resistive thin film electrolyte 150 is deposited on the electrochromic anode 140. In a preferred embodiment, a nominally 0.5–2 um thick film of a lithium ion conducting electrolyte is used. In the most preferred embodiment, the ion conducting electrolyte layer 150 is deposited on the anode 140 by means of an innovative ion-assisted thermal evaporation process which is described below. The electrolyte material preferably has a high density, a high ionic conductivity, a low electronic conductivity, a high decomposition potential which is higher than the maximum device operating voltage, and a high decompositional or breakdown electric field.

While any electrolyte material having these characteristics would be suitable, lithium phosphorus oxynitride, lithium niobate, lithium aluminum silicate and lithium silicon oxynitride have been shown to be particularly useful. In a preferred embodiment, the ionic conductivity of the electrolyte 150 is at least $5 \times 10^{-7}$ S/cm, the decomposition voltage is at least 6.0 Volts, and the decompositional or breakdown electric field is 6.7 V/$\mu$m, as conventionally measured by current instability and decay over a range of applied voltages.

In a preferred embodiment, a lithium phosphorus oxynitride (LiPON) thin film electrolyte 150 is deposited by the ion beam assisted thermal evaporation process of the present invention. In the most preferred embodiment, the ionic conductivity of the electrolyte 150 is at least $1 \times 10^{-6}$ S/cm, the electrolyte decomposition voltage is at least 10.0 Volts, and the decompositional or breakdown electric field is 10.0 V/$\mu$m. Ionic conductivity measurements of the as-deposited lithium phosphorus oxynitride electrolyte are made with aluminum electrodes using an Al/LiPON/Al configuration. Ionic conductivity is calculated from impedance data measured at 5 mV between 10 Hz and 105 Hz using an M263 Potentiostat- Galvanostat and a 5210 Lock-in Amplifier (Keithley Instruments, Cleveland, Ohio).

Comparative density measurements were obtained on electrolyte films 150 produced by the method of the current invention and films produced by conventional evaporation and sputtering methods. By combining conventional measurements of film mass made with an IC6000 quartz crystal oscillator (Inficon, East Syracuse, N.Y.) with film thickness measurements made with a Surfanalyzer 150 profilometer (Federal Products Corp., Providence, R.I.), film densities were measured on samples of as-deposited electrolyte films 150. The as-deposited electrolyte film density obtained with the deposition method of the present invention had a density of 2.4 g/cm$^3$ compared to the 2.5 g/cm$^3$ theoretical density for lithium phosphorus oxynitride.

An electrochromic cathode layer 160 is deposited on the electrolyte layer 150. Lithiated metal oxides and lithiated mixed oxides of cobalt, nickel, titanium, chromium and vanadium, tin oxide, indium oxide, indium tin oxide and tin oxide amorphous glasses have been shown to be particularly useful as lithium insertion materials used as cathodes. In a preferred embodiment, a sputtered thin film of lithium cobalt oxide is utilized as the cathode 160. Typically, a 1200–1900 Å thick film of $LiCoO_2$ is utilized as the cathode layer 160. In a preferred embodiment, a 1200 Å thick layer of $LiCoO_2$ is utilized. In a preferred embodiment, this cathode 160 exhibits a reversible lithium extraction efficiency (y %) of at least eighty percent after at least 400 device recharging cycles. In the most preferred embodiment, the cathode 160 exhibits an eighty percent extraction efficiency after 20,000 cycles. In the most preferred embodiment, the relative film thicknesses of the $WO_3$ anode 140 and $LiCoO_2$ cathode 160 are adjusted to balance the overall charge capacity of the device. In this embodiment, the optimum cathode 160 deposit thickness is adjusted to yield a $WO_3/LiCoO_2$ film thickness ratio of approximately 1.2.

In one optional embodiment, an optically transparent, electronically conductive, ohmic contact layer 170 may be deposited on the electrochromic cathode layer 160. Any stable, oxidation resistant, optically transparent, metallic or semi-metallic conductor can be utilized as an ohmic contact layer 170. For example, transition metal nitrides, such as titanium nitride, zirconium nitride, and hafnium nitride, would be particularly useful as ohmic contacts. In a preferred optional embodiment, a nominally 60–100 Å thick titanium nitride (TiN) layer is utilized as an ohmic contact between a $LiCoO_2$ cathode layer 160 and an $In_2O_3$ transparent conductor layer 180. The TiN contact layer 170 is required when using a $LiCoO_2$ cathode 160 and $In_2O_3$ conductor 180 due to the p-n heterojunction which forms between these two materials and blocks electron transport and impedes switching between bleached and colored states.

In one embodiment, a second optically transparent conductor layer 180 is deposited on either the optional ohmic contact layer 170, or, alternatively, directly on the electrochromic cathode layer 160. This second conductor layer 180 is used for making electrical contact with an external voltage source 500. In one preferred embodiment the second transparent conductor 180 is a nominally 500–3000 Å thick coating of indium oxide. Alternatively, a nominally 500–3000 Å thick film of indium tin oxide (ITO) may also be utilized. In the most preferred embodiment, a 1000 Å thick film of indium oxide is used as a second transparent conductor 180.

In a preferred embodiment, an encapsulant or packaging layer 190 is deposited on the second transparent conductor layer 180 for sealing the device and protection from atmospheric oxygen or humidity. In a preferred embodiment, a nominally 2000 Å thick film of silicon nitride is sputter deposited to seal the surface of the transparent conductor layer 180. For reasons discussed previously, this sealing layer 190 is particular important for protecting an $In_2O_3$ conductor layer 180 from atmospheric oxygen and humidity. Any other suitable packaging materials may be utilized which are optically transparent and create barriers to water vapor and oxygen exposure. For example, a variety of thin transparent coatings of metals, ceramics, glasses, or polymers which can be applied as an impervious overlay barrier, without disrupting device components or compromising optical properties, would be particularly useful.

3. Electrochromic Device Fabrication

In this section, a fabrication method is provided for one embodiment of a device of the present invention as described in the previous section. The sequence of deposition steps, the number of deposition layers, and the composition or type of layers which are deposited may be varied to achieve desired results without departing from the teachings of the present invention.

Sodalime glass microscope slides, nominally 1×3 inches and 2×3 inches, were used as transparent substrates 110 for fabricating the electrochromic devices 100 of Examples 1 through 4. Prior to deposition, slides were cleaned in a 10% solution of Liquinox, rinsed in distilled water, and dried in nitrogen. Samples were stored in sealed plastic boxes for handling and transfer between deposition systems. If a particular deposition process required sample heating, samples were cooled to room temperature prior to transfer to another processing stage. All processing was carried out in a Class 10,000 clean room.

Figure 6:
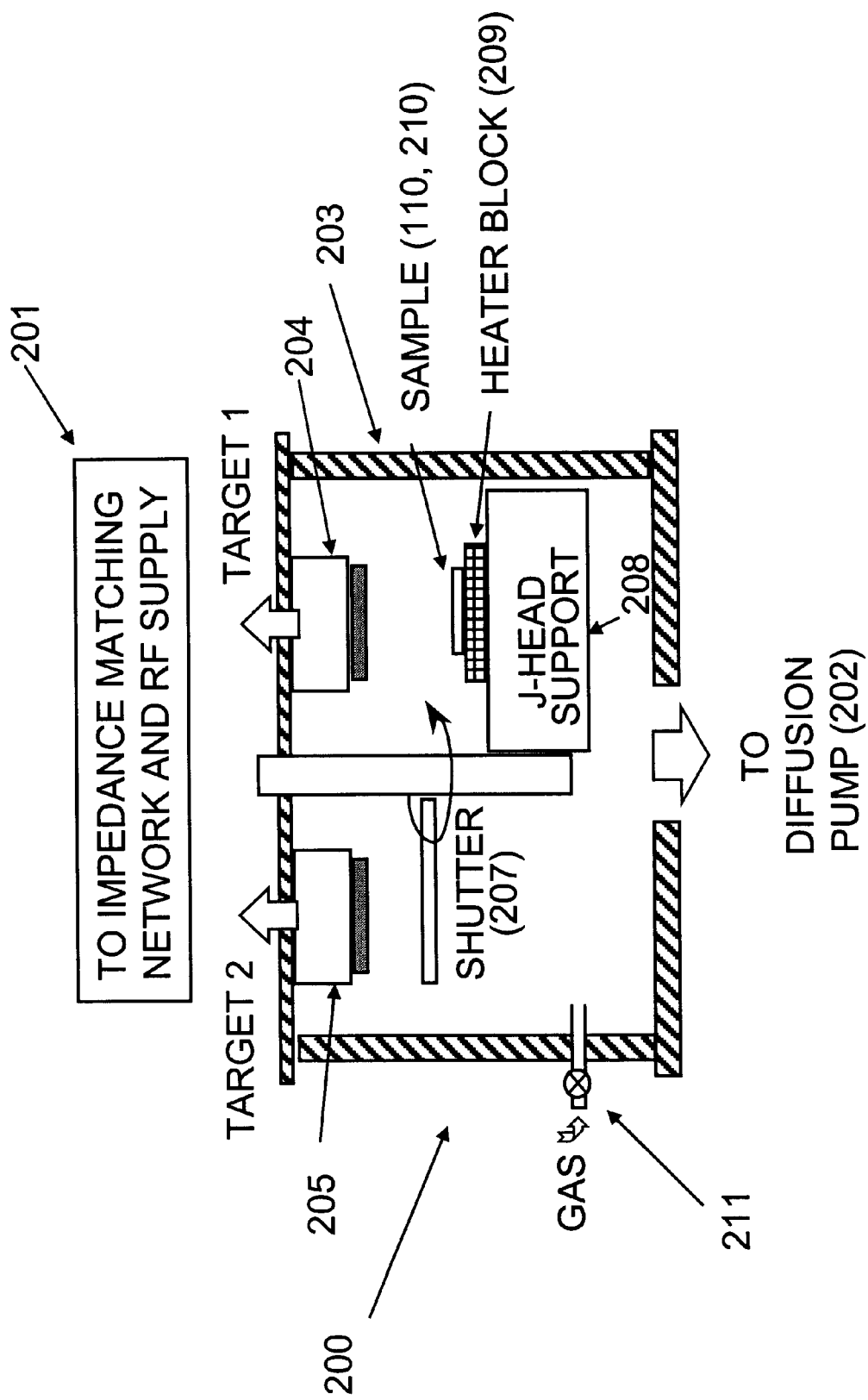
FIG. 6 is a schematic diagram of the rf sputtering system used for sputtered coatings.

A radio frequency sputtering system 200 (FIG. 6) was used for deposition of ITO, SiC, $WO_3$, $LiCoO_2$, sodiation treatments, and lithiation treatments. The sputtering system 200 was manufactured by Materials Research Corp. (Orangeburg, N.Y.) and equipped with a Plasma-Therm Inc. (Kpesson, N.Y.) power supply 201 and a Consolidated Vacuum Corp. (Rochester, N.Y.) pumping system 202. This system is comprised of a vacuum chamber 203 coupled to a high vacuum pumping system 202, dual sputtering source mounts 204, 205, a turntable 206 equipped with a source shutter 207 and substrate sample support 208. Transparent substrates 110, or device substrates 210, are mounted on a copper heater block 209 heated by six imbedded 50 Watt cartridge heaters. A gas inlet port 210 equipped with a valve 211 is provided for introducing inert or reactive gases used for purging or reaction during the sputtering process.

In one embodiment, a 5 inch diameter indium tin oxide target 205 comprising 8% tin, available from Cerac Inc. (Milwaukee, Wis.), is sputter deposited on the transparent substrate 110, or device substrate 210, to form a first transparent conductor layer 120. The rf sputtering system 200 shown in FIG. 6 was utilized for all ITO depositions. In a preferred embodiment, the substrate 110 (210) is maintained at approximately 440° C. with a heater block 209. Experiments have indicated that a heated substrate is required to ensure high crystallinity and oxidation stability of the ITO layer. Typically, ITO films deposited on room temperature substrates exhibit unstable electrical and optical properties. In preferred embodiments, the substrate 110 temperature is maintained above 300° C. during ITO deposition. Target sputtering power was set to 200W and sputtering was conducted at a frequency of 13.56 Mz with an initial background pressure of $5 \times 10^{-6}$ torr and an oxygen partial pressure of 10±2 millitorr during sputtering. Target to substrate throw distance was approximately 7.5 cm. Under these conditions, typical ITO deposition rates are 1 Å/sec. Deposition run times varied from 11 to 40 minutes. Film thickness for the ITO transparent conductor layer 120 varied from 500–3000 Å. After deposition, depending on the choice of the subsequent deposition layer, the substrate is either allowed to cool to room temperature, for deposition of a silicon carbide ion blocking layer 130, or maintained at 440° C., for deposition of a tungsten oxide anode layer 140.

In an optional embodiment, a lithiated silicon carbide ion blocking layer 130 is sputter deposited on the transparent conductor layer 120 using a modification of the rf sputtering system 200. Lithiation of the SiC layer was done to assure an n-type SiC layer so as to avoid formation of a back-to-back n-p-n heterojunction between the ITO and $WO_3$ layers. For this deposition step, the positions of the substrate and target were inverted with the target facing upwards, and the sample facing down. This sample-target configuration was shown to yield a cleaner and more uniform SiC deposit. For deposition of lithiated SiC, nine lithium carbonate ($Li_2CO_3$) pressed pellets made from ACS grade powder (Alfa-Johnson Matthey (Ward Hill, Mass.) were positioned on top of a 4×4 inch sintered SiC target (Norton Co., Worcester, Mass.). The device substrate 210 is maintained at room temperature in the heater block 209. The lithium concentration and thickness of the deposit were very sensitive to deposition parameters at high power and low chamber pressure. To improve control of deposit properties, the $SiC$-$Li_2CO_3$ target was presputtered for 20–30 minutes prior to deposition. Sputtering power was set to 200W and sputtering was conducted at a frequency of 13.56 Mz with an initial background pressure of $1 \times 10^{-6}$ torr and an argon partial pressure of 1 millitorr during sputtering. Target to substrate throw distance was approximately 8 cm. Under these conditions, typical lithiated SiC deposition rates were 2.5 Å/sec. Deposition run times varied from 2 to 3 minutes. Film thickness for the SiC ion blocking layer 130 varied from 200–500 Å.

If an optional silicon carbide blocking layer 130 is deposited as a prior step, a separate rf sputtering system 200 is configured with a conventional target-substrate orientation in preparation for deposition of an electrochromic anode layer 140. In a preferred embodiment, a $WO_3$ anode layer is deposited using a 5 inch $WO_3$ target, available from Cerac Inc. The substrate 210 temperature is brought to 440° C. prior to commencement of sputtering. This substrate temperature was selected to ensure deposition of a crystalline phase which would result in a low electron scattering parameter for the $WO_3$ layer 140. The tungsten oxide anode layer 130 is sputter deposited on either the optional SiC blocking layer 130, if used, or the transparent conductor layer 120. Target sputtering power was set to 200W and sputtering was conducted at a frequency of 13.56 Mz with an initial background pressure of $5 \times 10^{-6}$ torr and an oxygen partial pressure of 10±1 millitorr during sputtering. Target to substrate throw distance was approximately 7.5 cm. Under these conditions, typical $WO_3$ deposition rates were 1 Å/sec. Deposition run times varied from 40 to 70 minutes. Film thickness for the $WO_3$ anode layer 140 varied from 1000–2000 Å. In a preferred embodiment, a film thickness of 1500–1600 Å is utilized. These deposition conditions were selected to obtain the highest colored-state reflectivity from the $WO_3$ layer 140 following $Li^+$ insertion during charging of the electrochromic device 100.

In the most preferred embodiment, an electrochromic anode layer 140 is deposited on either the optional SiC blocking layer 130, if used, or, alternatively, the transparent conductor layer 120 using the ion beam assisted thermal evaporation method of the present invention. In the most preferred embodiment, a tungsten oxide anode film 140 is deposited from a tungsten source 304, such as tungsten metal, tungsten oxide, or a tungsten compound, using the ion beam assisted thermal evaporation method and system 300 disclosed herein for the electrolyte layer 150 deposition.

Figure 7:
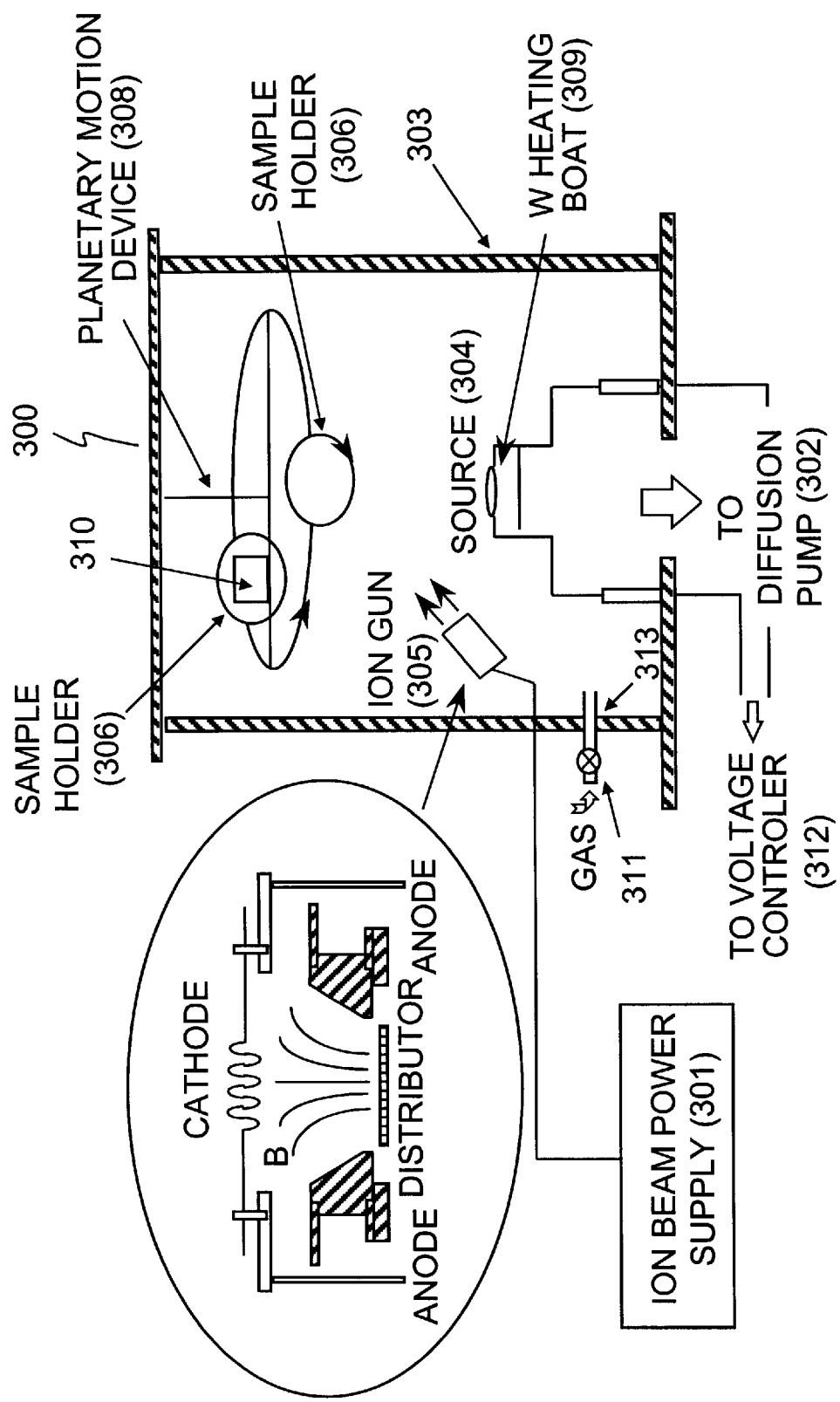
FIG. 7 is a schematic diagram of the ion beam assisted thermal evaporation system of the present invention.

In this preferred embodiment for anode layer 140 deposition, the deposition system 300 of FIG. 7 is utilized with some modifications. An oxygen ion gun 305 comprising a Mark I controller 301 with a Gridless Ion Source 305, available from Commonwealth Scientific Corp. (Alexandria, Va.), is utilized together with a resistively heated thermal evaporator boat 309. Evaporation of the tungsten source 304 is achieved heating the boat 309 to an appropriate evaporation temperature. In another embodiment, the tungsten source 304 may be heated by an e-beam evaporator gun. For a typical deposition, the ion beam gun 305 anode voltage is set at approximately 160 volts, anode current is set at approximately 0.3 amps, and cathode current is approximately 16 amps. The inherent design and operating characteristics for the Commonwealth ion gun 305 provide for an ion beam energy of approximately 60% of the anode voltage. In a typical deposition run, the substrate 310 is presputtered with the oxygen ion beam 305. The ion gun 305 is then shut off as the source target 304 is heated to the source evaporation temperature. Once the source target 304 evaporation commences and deposits start to form on the substrate 310, the ion gun 305 is again switched on and deposition proceeds until the desired anode film thickness is achieved. In a preferred embodiment, the substrate 310 temperature is monitored with a thermocouple and deposition is periodically suspended when the substrate 310 temperature increases beyond 80° C. during deposition. In an alternative preferred embodiment, the substrate 310 may be cooled with an auxiliary cooling system to prevent heating. Film thickness for the deposited $WO_3$ anode layer 140 typically range between 1000–2000 Å. In a preferred embodiment, a film thickness of 1500–1600 Å is utilized.

While anode film 140 deposition rates of more than 25 Å per second can be achieved, the deposition rate is adjusted to produce an optimum quality anode deposit 140. After deposition, the substrate 310 is allowed to cool to room temperature prior to transfer to a subsequent deposition system for deposition of the electrolyte layer 150.

As an optional embodiment, a sodiation treatment of the $WO_3$ anode layer 140 may be performed for enhancing its reflectivity in the colored-state. Sodiation is accomplished by rf sputtering a 5 inch sodium carbonate ($Na_2CO_3$) target 205 made from pressed high purity powder, available from Alpha-Johnson Matthey. Target sputtering power was set between 20–80 Watts and sputtering was conducted at a frequency of 13.56 Mz with an initial background pressure of $1 \times 10^{-6}$ torr and an argon partial pressure of 10 millitorr during sputtering. During sodiation treatments, the sample substrate 210 potential can be floated, electrically grounded or negatively biased to control $Na^+$ doping levels. After either the $WO_3$ deposition or the optional sodiation treatment, the substrate 210 is allowed to cool to room temperature prior to being transferred to a ion beam assisted thermal evaporator system 300 for deposition of an ion conducting electrolyte layer 150.

In a preferred embodiment, an ionically conductive, electronically resistive, thin film electrolyte 150 is deposited on the electrochromic anode layer 140. The integrity of the ion conducting electrolyte layer 150 is critical to the overall performance of the electrochromic device 100. Since electronic leakage in the electrolyte layer 150 compromises the performance and longevity of the device 100, dense electrolyte films free of electrically conductive paths are required.

Preliminary investigations of lithium-phosphorus-oxynitride (LiPON) electrolyte depositions were performed to evaluate rf sputtering, rf magnetron sputtering and electron beam evaporation methods. Evaporated LiPON films exhibited low density, typically less than 2 g/cm³, and were prone to developing stress induced cracks both during subsequent device processing steps and following repetitive coloring(charge)-bleaching(discharge) cycles at moderate voltages. RF sputtered LiPON films tended to be highly irregular with considerable surface roughness. Nitrogen content of these films was difficult to control. These films had unacceptable amount of electronic leakage. In addition, deposition rates were extremely slow with this method. Magnetron sputtered LiPON films had higher densities, typically 2.2 g/cm³, higher electronic yields due to less leakage, and were stable at higher deposition processing temperatures. However, these films also were prone to stress-induced cracking. In addition, the maximum deposition rate achieved with this method, 0.3 Å/sec, was unacceptably slow.

Since the overall performance of the electrochromic device 100 is critically dependent on the ion transport and electronic characteristics of the electrolyte layer 150, the evaluation of existing deposition techniques indicated that the development of an innovative deposition method was required to produce an acceptable electrolyte layer 150 with requisite properties. The preferred deposition method should be capable of depositing dense electrolyte films 150 with high yields, minimal electronic leakage, low susceptibility to stress-induced cracking, at high deposition rates.

To overcome the limitations of existing deposition processes, an innovative ion beam assisted thermal evaporation deposition technique was developed as the preferred electrolyte film 150 deposition method of the present invention. The advantages of ion assisted depositions have been discussed elsewhere [see F. A. Smidt, *International Materials Review*, 35(2):61–128 (1990); *Handbook of Ion Beam Processing Technology*, ed. J. J. Cuomo, et al, (Noyes Publications,1989)]. This deposition method relies on bombardment of a thin film deposit with energetic ions during deposition of the film. With this approach, the microstructure and properties of the as-deposited film are altered. For example, deposit grain size, surface morphology, residual stresses, crystallographic orientation, adhesion, and density may be modified. The degree of deposit modification is dependent on both ion beam energy and ion beam current which is adjusted to create preferred deposit properties.

The deposition system 300 used for electrolyte depositions is shown schematically in FIG. 7. The deposition system 300 comprises a conventional vacuum chamber 303, a conventional diffusion pumping system 302, a resistively heated boat 309 which heats the source target 304 and thermally evaporates vapor for condensation on the substrate 310, and an ion beam gun 305 with beam power supply 301, which bombards the condensed deposit on the substrate 310 with energetic ions, forming a preferred electrolyte film 150 structure. The chamber is fitted with a conventional planetary motion device 308 which can accommodate multiple sample holders 306. A gas port 313 and gas control valve 311 are provided for introducing either inert purge gases or reactive gases to the chamber 303.

The preferred ion beam 305 for this deposition method is an End Hall gun which produces relatively low voltage, less than 170 Volts, but a relatively high current density ion beam, up to 1 milliAmp/cm². The advantage of this gun design is that a higher beam current can be attained at a given voltage. A low voltage gun was selected to avoid substrate 310 etching during bombardment but provide for deposit densification. A high current gun was selected to create a high rate of ion arrival at the substrate surface 310 to allow for high deposition rates. This gun design is also easier to maintain and operate. For the deposition system 300 shown in FIG. 7, a Mark I controller 301 with a Gridless Ion Source 305, available from Commonwealth Scientific Corp. (Alexandria, Va.) was employed. For LiPON deposition runs, beam energies of approximately 60 eV were typically used.

In the most preferred embodiment, a lithium phosphorus oxynitride (LiPON) electrolyte film 150 is deposited using the ion beam assisted thermal evaporation method of the present invention. A lithium orthophosphate evaporation source 304, comprised of a pressed powder $Li_3PO_4$ pellet, available from Alpha-Johnson Matthey, is used as a source of lithium, phosphorus and oxygen. For LiPON deposition, a nitrogen ion gun 305 is utilized together with a resistively heated thermal evaporator boat 309 and voltage controller 312 for evaporation of the lithium orthophosphate source 304. For a typical deposition run, the ion beam 305 nitrogen flow is adjusted to 9.9 scfm, the ion beam 305 anode voltage is set between 80 to 100 volts, anode current is set at approximately 0.9–1 amps, and cathode current is adjusted to between 12 to 14 amps. The inherent design and operating characteristics for the Commonwealth ion gun 305 provide for an ion beam energy of approximately 60% of the anode voltage. Typically, the initial chamber pressure is evacuated to $6\times10^{-7}$ torr and the partial pressure of nitrogen is maintained at $4\times10^{-4}$ torr during deposition.

In a typical deposition run, the substrate 310 is pre-sputtered with the nitrogen ion gun beam 305. The ion gun 305 is then shut off as the source target 304 is heated. Once the source target 304 evaporation vapors begin to deposit on the substrate 310, the ion gun 305 is again switched on as deposition proceeds. In a preferred embodiment, the substrate 310 temperature is monitored with a thermocouple and deposition is periodically suspended when the substrate 310 temperature increases beyond 80° C. during deposition. In an alternative preferred embodiment, the substrate 310 may be cooled with an auxiliary cooling system to prevent heating. Experiments have indicated that heating of the substrate 310 during deposition of the electrolyte layer 150 should be avoided to minimize thermal stresses and subsequent stress-induced failure of the electrochromic device 100.

While LiPON deposition rates of greater than 25 Å/sec are achievable with this method, in the preferred embodiment, electrolyte deposition rates are typically restricted to 5±1 Å/sec so as to ensure electrolyte film 150 integrity and avoid substrate 310 heating. Electrolyte film 150 deposition rates were measured with a quartz deposition monitor and an Inficon IC 6000 Process Controller.

The quality of LiPON electrolyte films deposited by this preferred method of the present invention are substantially better than electrolyte films obtained by conventional evaporation and sputtering methods. LiPON electrolyte film 150 densities produced by this preferred embodiment are typically close to the theoretical density of 2.4 g/cm$^3$. Current-Voltage measurements on deposited films indicated that electrolyte breakdown voltages exceeded 10 Volts. Impedance spectroscopy measurements exhibited ionic conductivities ranging from $5\times10^{-7}$ to $1\times10^{-6}$ S/cm. In addition, repetitive charge-discharge cycling has demonstrated that electrolyte films deposited by the preferred method are durable and electronically stable.

In a preferred embodiment, an electrochromic cathode layer 160 is deposited on the electrolyte layer 150. Lithiated metal oxides and lithiated mixed oxides of cobalt, nickel, chromium and vanadium, tin oxide, indium oxide, indium tin oxide and tin oxide amorphous glasses have been shown to be particularly useful as lithium insertion materials used as electrochromic cathodes 160.

In a preferred embodiment, a 5 inch diameter lithium cobalt oxide ($LiCoO_2$) target 205, available from Cerac Inc., is sputter deposited on the device substrate 210, to form the cathode layer 160. A separate rf sputtering system 200, similar to that shown in FIG. 6, was utilized for all $LiCoO_2$ depositions to avoid cross-contamination with other materials. In preferred embodiments, the substrate 210 is not heated during deposition and is maintained at room temperature. In an alternative embodiment, the substrate 210 may be cooled with an auxiliary cooling system. Experiments have indicated that while heating the substrate 210 produces $LiCoO_2$ layers 160 of superior crystallinity, thermomechanical stresses generated by heating produce cracking in the underlying electrolyte layer 150. In addition, sputtering at high power, from 150 to 200 Watts, produces indirect heating of the substrate 210 with prolonged sputtering times. To minimize indirect heating, in the preferred embodiment, the target sputtering power was set at 100W. Sputtering was conducted at a frequency of 13.56 Mz with an initial background pressure of $2\times10^{-6}$ torr. An oxygen partial pressure of 10±2 millitorr was maintained during sputtering. Target to substrate throw distance was approximately 7 cm. Under these conditions, typical $LiCoO_2$ deposition rates were 0.4–0.5 Å/sec. Deposition run times varied from 60 to 80 minutes. Substrate 210 temperatures are monitored with a thermocouple and, during prolonged deposition runs, sputtering is periodically suspended to enable the substrate 210 to cool to room temperature. Film thickness for the $LiCoO_2$ cathode layer 160 typically ranged between 1200–1900 Å. In a preferred embodiment, a cathode layer 160 thickness of 1200 Å is utilized. After deposition, the substrate 210 is allowed to cool to room temperature prior to transfer to a subsequent deposition system for the next deposition layer.

In the most preferred embodiment, an electrochromic cathode layer 160 is deposited on the electrolyte layer 150 using the ion beam assisted thermal evaporation method of the present invention and deposition system 300 (FIG. 7). In the most preferred embodiment, a lithium cobalt oxide film 160 is deposited from a lithium source 304a and a cobalt source 304b using a modification of the ion beam assisted thermal evaporation method and system 300 disclosed herein for electrolyte layer 150 deposition.

In this preferred embodiment for the cathode layer 160 deposition, the deposition system 300 of FIG. 7 is utilized with some modifications. An oxygen ion gun 305 comprising a Mark I controller 301 with a Gridless Ion Source 305, available from Commonwealth Scientific Corp. (Alexandria, Va.) is utilized together with a pair of resistively heated thermal evaporator boats 309a, 309b. Evaporation of lithium and cobalt is achieved by using two resistively heated sample boats 309a and 309b in combination.

In one embodiment, a lithium source target 304a, comprising either lithium metal, lithium intercalated carbon, or lithium compound, is used in combination with a cobalt source target 304b, comprising either cobalt metal or cobalt oxide., each source target 304a, 304b contained in its own sample boat 309a, 309b. In another embodiment, the lithium source target 304a and cobalt source target 304b may be heated by a dual e-beam gun.

For a typical deposition, the ion beam 340 anode voltage is set at approximately 160 volts, anode current is set at approximately 0.3 amps, and cathode current is approximately 16 amps. The inherent design and operating characteristics for the Commonwealth ion gun 305 provide for an ion beam energy is approximately 60% of the anode voltage. In a typical deposition run, the substrate 310 is pre-sputtered with the oxygen ion beam 305. The ion gun 305 is then shut off as the two source targets 304a, 304b are each heated to their respective evaporation temperatures. Once the source target 304a, 304b evaporation commences and deposits start to form on the substrate 310, the ion gun 305 is again switched on and deposition proceeds until the desired cathode film thickness is achieved. In a preferred embodiment, the substrate 310 temperature is monitored with a thermocouple and deposition is periodically suspended when the substrate 310 temperature increases beyond 80° C. during deposition. In an alternative preferred embodiment, the substrate 310 may be cooled with an auxiliary cooling system to prevent heating.

Film thickness for the deposited $LiCoO_2$ cathode layer 160 typically range between 1200–1900 Å. In a preferred embodiment, a cathode layer 160 thickness of 1200 Å is utilized. While cathode film 140 deposition rates of more than 25 Å per second can be achieved, the deposition rate is adjusted to reduce substrate 310 heating and produce an optimum quality cathode layer 160. After deposition, the substrate 310 is allowed to cool to room temperature prior to transfer to a subsequent deposition system for the next deposition layer.

In an optional embodiment, an optically transparent, electronically conductive, ohmic contact layer 170 may be deposited on the electrochromic cathode layer 160. In a preferred optional embodiment, a 60–100 Å thick titanium nitride layer is sputter deposited as an ohmic contact 170 between the $LiCoO_2$ cathode layer 160 and an indium oxide transparent conductor layer 180. In the most preferred embodiment, a 60 Å TiN layer is utilized. Sputtering was conducted using rf-magnetron sputtering system (Consolidated Vacuum Corp., Rochester, N.Y.) similar to the deposition system 200 shown in FIG. 6. A two inch diameter TiN target, available from Cerac Inc., was preconditioned by sputtering in nitrogen for 15 minutes at 100–200 Watts power at a nitrogen partial pressure of 8±1 millitorr. Sputtering was conducted at 200 watts power with an initial chamber vacuum of $3 \times 10^{-6}$ and a argon partial pressure of 2±0.5 millitorr maintained during deposition. A deposition rate of 0.8 Å was typically utilized.

In one embodiment, a second optically transparent conductor layer 180 is deposited on either the optional ohmic contact layer 170 or, alternatively, directly on the electrochromic cathode layer 160. In a preferred embodiment, a 500–3000 Å thick indium oxide ($In_2O_3$) layer 180 is utilized. In the most preferred embodiment, a 1000 Å thick $In_2O_3$ layer 180 is used.

Figure 8:
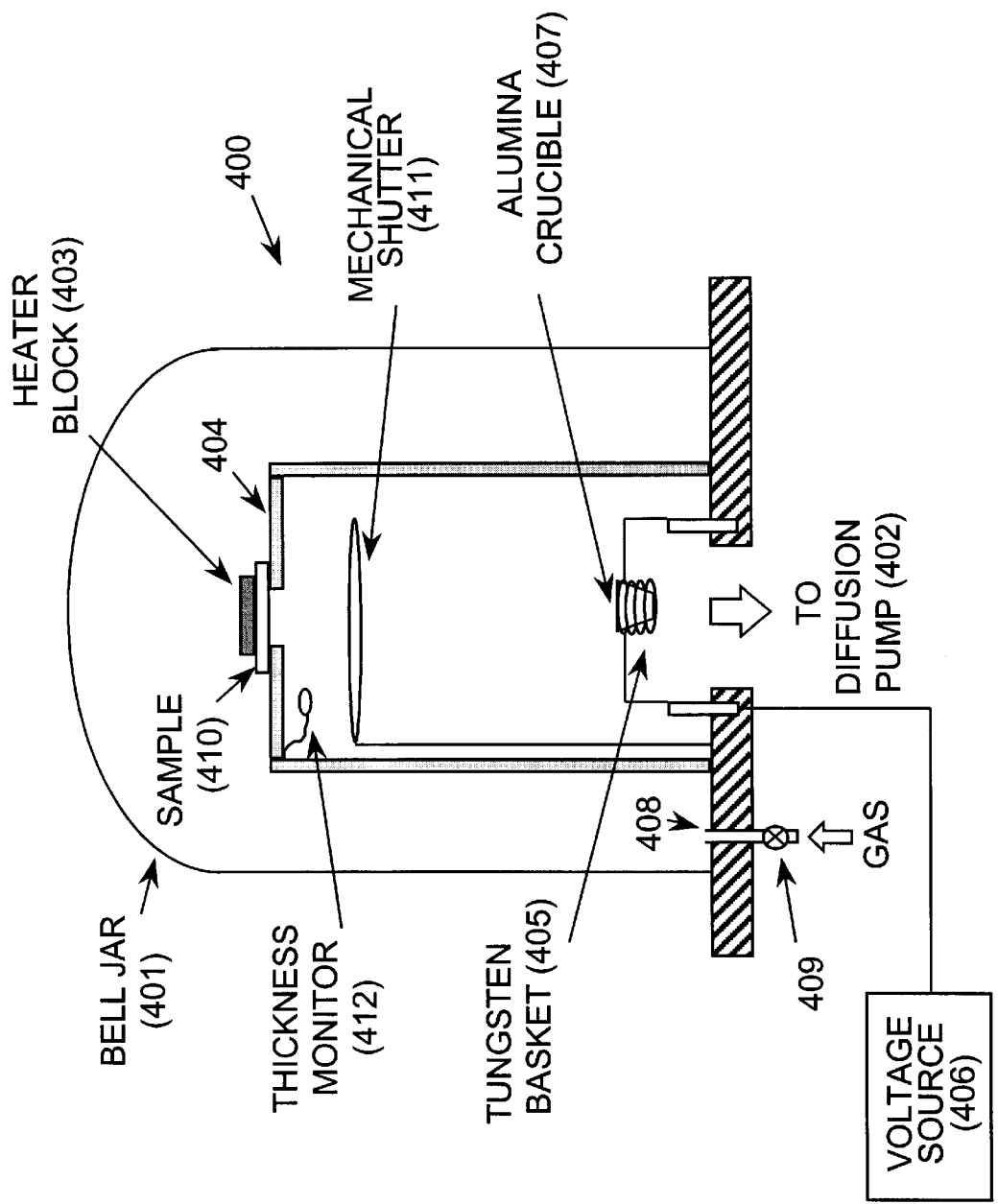
FIG. 8 is a schematic diagram of the thermal evaporation system used for indium oxide coatings.

In the preferred embodiment, indium oxide is deposited by thermal evaporation using the evaporation deposition system 400 shown in FIG. 8. The evaporation deposition system 400 is of conventional design and in manufactured by Consolidated Vacuum Corp. (Rochester, N.Y.). The system 400 is comprised of a vacuum bell jar 401, a diffusion pumping system 402, a sample heater 403 and sample support 404 for mounting a device substrate 410, a resistively heated tungsten wire basket 405 with voltage source 406, an alumina evaporation crucible 407, a chamber gas inlet 408 and control valve 409, a mechanical target shutter 411, and a deposition monitor 412.

In one embodiment, a 1:1 to 2:1 mixture of high purity indium metal and $In_2O_3$ powders, available from Cerac Inc., is used as the indium oxide evaporation source which is charged to the crucible 407. Prior to loading the alumina crucible 407 in the deposition chamber, the powders are premixed in the crucible 407 while heating on a hot plate. The source-target substrate throw distance is approximately 27 cm. The substrate is heated to between 100–300° C., most preferably 210–300° C. Substrate heating must be carefully controlled to prevent thermomechanical stress in the previously deposited device layers and avoid cracking in the electrolyte 150. In a typical deposition run, the indium source is heated to an evaporation temperature of 1000° C. Prior to a deposition run, the bell jar is evacuated to $3 \times 10^{-6}$ torr and a 2±0.5 millitorr partial pressure of oxygen is maintained in the chamber for the deposition. The target shutter 411 is opened and deposition proceeds for about 25 minutes. Under these conditions, a typical $In_2O_3$ deposition rate of 1 Å/sec is achieved.

In one optional embodiment, an indium oxide layer is deposited directly on a lithiated lithium electrolyte 150 and the indium oxide layer functions as a cathode layer 160. In this embodiment, $LiCoO_2$, or any other substitute cathode material, is omitted and the indium oxide layer functions as a lithium insertion material, or cathode layer 160, by incorporating the excess lithium from the anode 140 lithiation treatment during discharge.

In a preferred embodiment, a transparent encapsulating or packaging layer 190 is deposited as a final layer to seal the device and provide protection from atmospheric oxygen or humidity. In a preferred embodiment, a 2000 Å thick film of silicon nitride ($Si_3N_4$) is sputter deposited to seal the final device layer.

In a preferred embodiment, silicon nitride is deposited with a VEECO Corp. rf sputtering system equipped with a Plasma-Therm Inc. power supply and rf generator. This system is similar to the deposition system 200 shown in FIG. 6. A high purity $Si_3N_4$ target, available from Cerac Inc., was used as a source target 204. In the preferred embodiment, the device substrate 210 temperature is maintained at room temperature during deposition. Typically, deposition was temporarily suspended every 15 minutes to allow substrates 210 to cool to room temperature. Target sputtering power was set to 200W and sputtering was conducted at a frequency of 13.56 Mz with an initial background pressure of $2 \times 10^{-6}$ torr, a nitrogen partial pressure of 2±0.5 millitorr, and an argon partial pressure of 1 millitorr during sputtering. Source to target substrate throw distance was approximately 6 cm. Under these conditions, typical silicon nitride deposition rates are 1.5 Å/sec. Deposition run times varied from 15 to 30 minutes.

Typically, after device fabrication is completed, the transmission of an electrochromic device improves following a first bleaching cycle. This has been attributed to initial extraction, reinsertion, and reordering of lithium ions in the cathode lattice. $LiCoO_2$ cathodes undergo a beneficial restructuring of lithium ions within the crystallographic lattice which improves lithium transfer and modulation. In a preferred embodiment, following completion of the deposition steps, a fully charged device is heated in the colored-state to improve device transmissivity in the bleached-state. In an alternative embodiment, this improvement can also be accomplished if the device is charged prior to the deposition of the $In_2O_3$ transparent conductor layer 180.

Figure 9A:
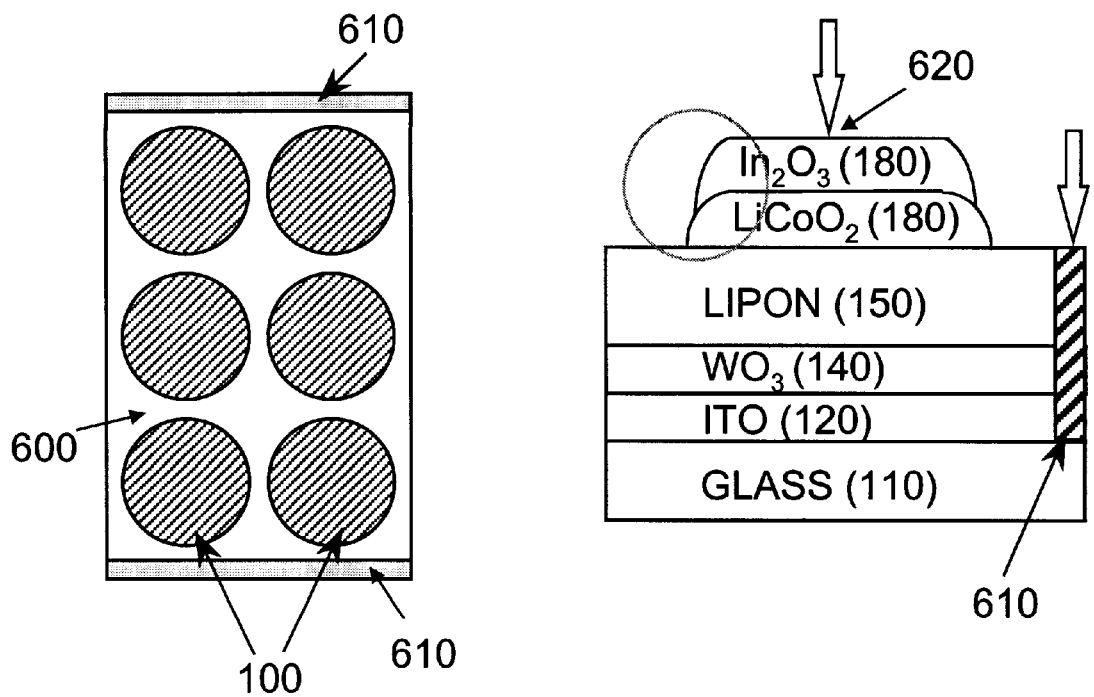
FIGS. 9a–b are schematic diagrams showing the method for fabricating a plurality of individual devices from a single multi-layered electrochromic device.
Figure 9B:
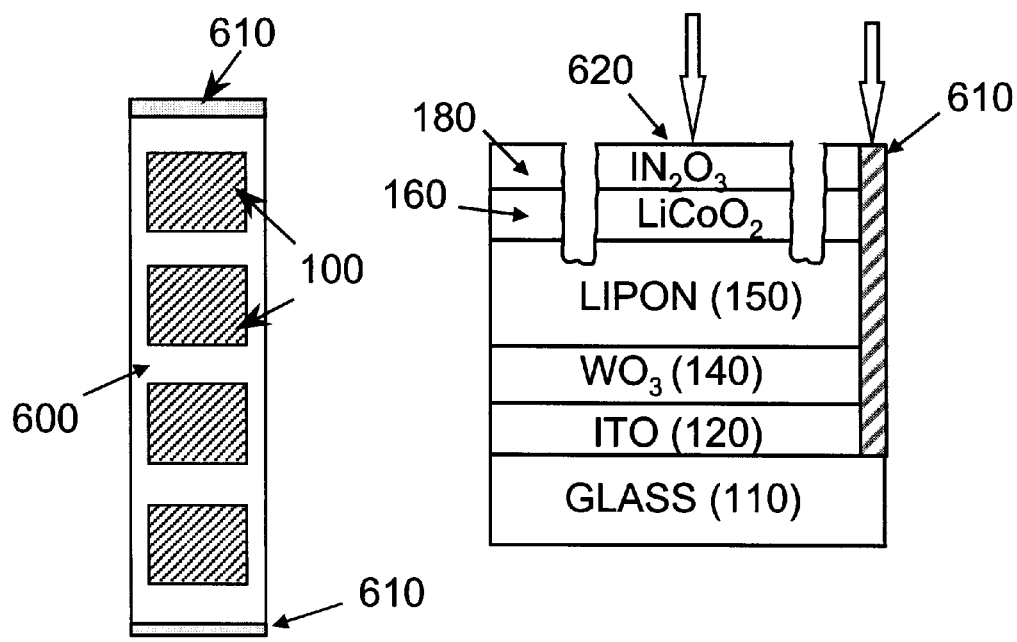

In one optional embodiment, shown in FIG. 9a–b, in order to fabricate multiple electrochromic devices 100 from a multi-layered deposit 600 on a single transparent substrate 110, two strips of indium oxide transparent conductor 610 are deposited along opposing parallel edges of the substrate 110 to form an electrical contact 610 with bottom transparent conductor 120. By either deposition masking, mechanical scribing or a laser ablation process, a plurality of individual electrochromic devices 100 may be fabricated from one multi-layered substrate 600.

In one embodiment, shown in FIG. 9a, a 0.1×1×3 inch aluminum mask, with six 1.5 inch diameter circular cutouts, was used for depositing six independent circular cathode 160 and conductor 180 deposits on an electrolyte layer 150, each circular deposit forming an individual device 100.

In another embodiment, shown in FIG. 9b, scribing or laser ablating the top layers of the multi-layered deposit, so as to cut through the top transparent conductor layer 180 down to the electrolyte layer 150, creates separate devices 100 and forms a second device contact 620 for each newly created device 100.

In one embodiment, mechanical scribing is accomplished with a diamond tipped scribe. In a preferred embodiment, a laser ablation process is utilized for forming separate devices 100. In this preferred embodiment, a U.S. Laser Corp. Holobeam Basic Series 257 YAG Laser was used for laser patterning of individual devices 100. The Laser was operated at 1000 Hz and was controlled by a Q-switch that was triggered by an external pulse signal. A fixed pulse width of 50 ns was used. The pulse signal was generated by the Counter 2 terminal output, having a 1 $\mu$s resolution, on a MetraByte Corp.DASH-16 Analog-Digital I/O Board mounted in a 487 PC computer. The number of laser firings was counted by a software interrupt routine that was syncronized by the Counter 2 output. Patterning was accomplished by translating the multi-layered substrate 600 on an xy-stage with a 2.5 $\mu$m step resolution. The TTL outputs on the I/O board were used to control x-y movement. A simple I/O board script program controlled and synchronized the laser, substrate translation and timing. Ablation was accomplished with a 50 mW, 50 ns pulse at 1060 nm and 530 nm wavelengths.

4. Alternative Electrochromic Device Configurations

The multi-layered electrochromic device of the present invention, and method of making the same, are not intended to be necessarily limited to any one configuration. Other layer and device configurations, having fewer or greater number of layers or inverted layer ordering or arrangements, are also envisioned and may be constructed by applying the methods taught herein.

5. Improved Device Switching Method

Methods for improving both the switching speed and uniformity of coloration of electrochromic devices when switching between colored and bleached states are desirable. Faster, more uniform switching is particularly desirable for large area electrochromic windows or for devices which employ transparent conducting layers 120, 180 with relatively high lateral resistance. It may be difficult to achieve high electronic conductivities with such devices even where transparent electronic conductor layers are utilized. This means that relatively high voltages may be required for switching such devices between colored and bleached states. The use of such high voltages may lead to non-uniform coloration and may exceed the device overpotential for reversible electrochemical reactions.

Figure 18:
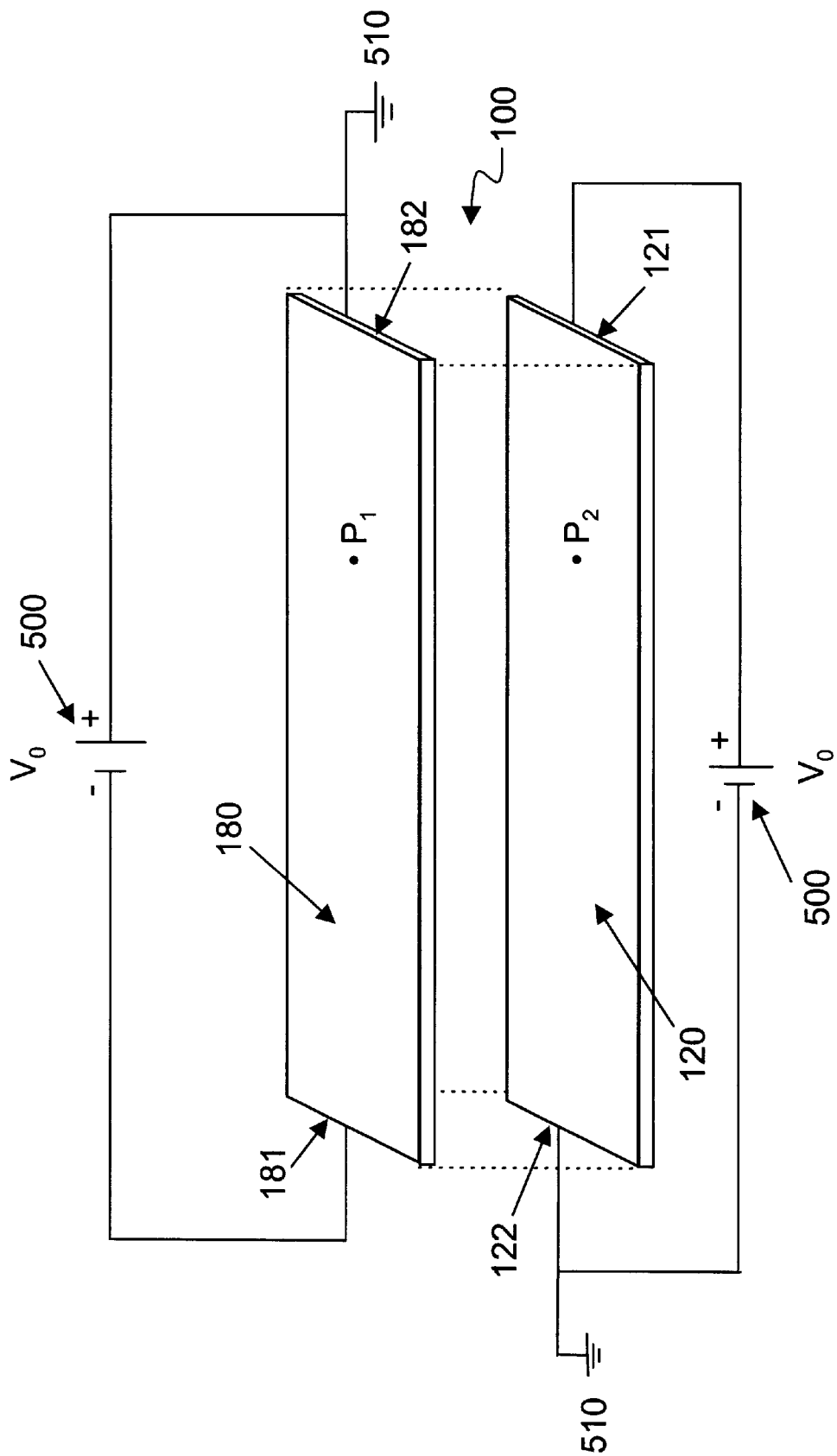
FIG. 18 is a schematic diagram of the innovative voltage supply configuration used with the device switching method of the present invention.

One switching method which eliminates the need for high switching voltages, promotes a more uniform coloration and avoids overpotentials is to employ a dual, split voltage supply 500 with a common electrical reference 510 where the reference 510 is at opposing edges 122, 182 of two transparent conductor layers 120, 180. A schematic of the voltage supply configuration 500, used with this device switching method is illustrated in FIG. 18. For clarity, only the two transparent conductor layers 120, 180 are shown in FIG. 18. Providing that each transparent conductor layer 120, 180 is a uniform conductor, there is a linear potential drop from one layer edge 121, 181 to the its opposing edge, 122,182 resulting in a uniformly distributed potential difference across the device. This approach provides for nearly uniform voltage differences across any opposing pair of points ($P_1,P_2$) across the device 100, thus providing for more uniform coloration during switching and avoiding the risk of device overpotential from high voltages.

6. Electrochromic Device Characterization

Electrical Testing

The electrochemical performance characteristics of electrochromic devices of the present invention were evaluated by subjecting device samples to repetitive coloring (charge)-bleaching (discharge) cycles using a Model 362 Potentiostat/Galvanostat scanning potentiometer (EG&G, Princeton, N.J.). Coloring and bleaching was typically performed in voltage steps of approximately 0.5 Volts up to a cycling maximum of between ±3 to ±5 Volts. Occasionally, voltages up to 9 Volts were used for testing cell overvoltage stability. The device current response was monitored throughout the charging cycle. A state of full charge was determined by monitoring device reflectivity or by visual coloration. After charging, the open circuit voltage decay of the device was monitored to test for electronic leaks and determine the electrical integrity of the device.

Optical Measurements

Reflectivity spectra were measured with a Beckman DK-1A spectrophotometer equipped with a modified sample mounting fixture which allowed for device switching between colored and bleached states. The spectrophotometer utilized a tungsten lamp source and had an operating measurement range from 0.4 to 2.5 $\mu$m. The scanning time for the entire spectrum was 3 minutes. A lead sulfide detector was utilized. Measurements were made at a 20° angle of incidence. All measurements were made against an aluminum reflectivity standard as reference and normalized to the reference. The uncertainty in reflectivity measurements was estimated at ±2 to 3% due to sample positioning uncertainties. Transmission spectra measurements were made with an OLIS Carry 17 spectrophotometer using an air reference. The instrument had an operating measurement range from 0.4 to 2.5 um. A lead sulfide detector was employed for wavelengths from 0.8 to 2.5 um and a photomultiplier was employed for wavelengths from 0.4 to 0.8 um. The scanning time for the entire spectrum was 5.5 minutes. Estimated uncertainty was ±2 to 3%. Absorption spectra measurements were calculated from transmission and reflectivity data.

7. Sample Devices

Sample electrochromic devices were fabricated using the materials and deposition methods taught and disclosed herein. The examples which follow are not meant to limit the scope of the materials, devices or configurations which are anticipated by the teachings of the present invention.

EXAMPLE 1

Five-Layer Device(Type I): A five layer device was fabricated using the materials, methods and apparatus of the present invention. A schematic of the individual device layers and corresponding layer thickness is shown in FIG. 10. This configuration is referred to as a five-layer device since it comprises an anode layer, a cathode layer, an electrolyte layer, and two ion blocking layers, one each for the anode and cathode layers. In this example, the anode was sodiated tungsten oxide.

Figure 11A:
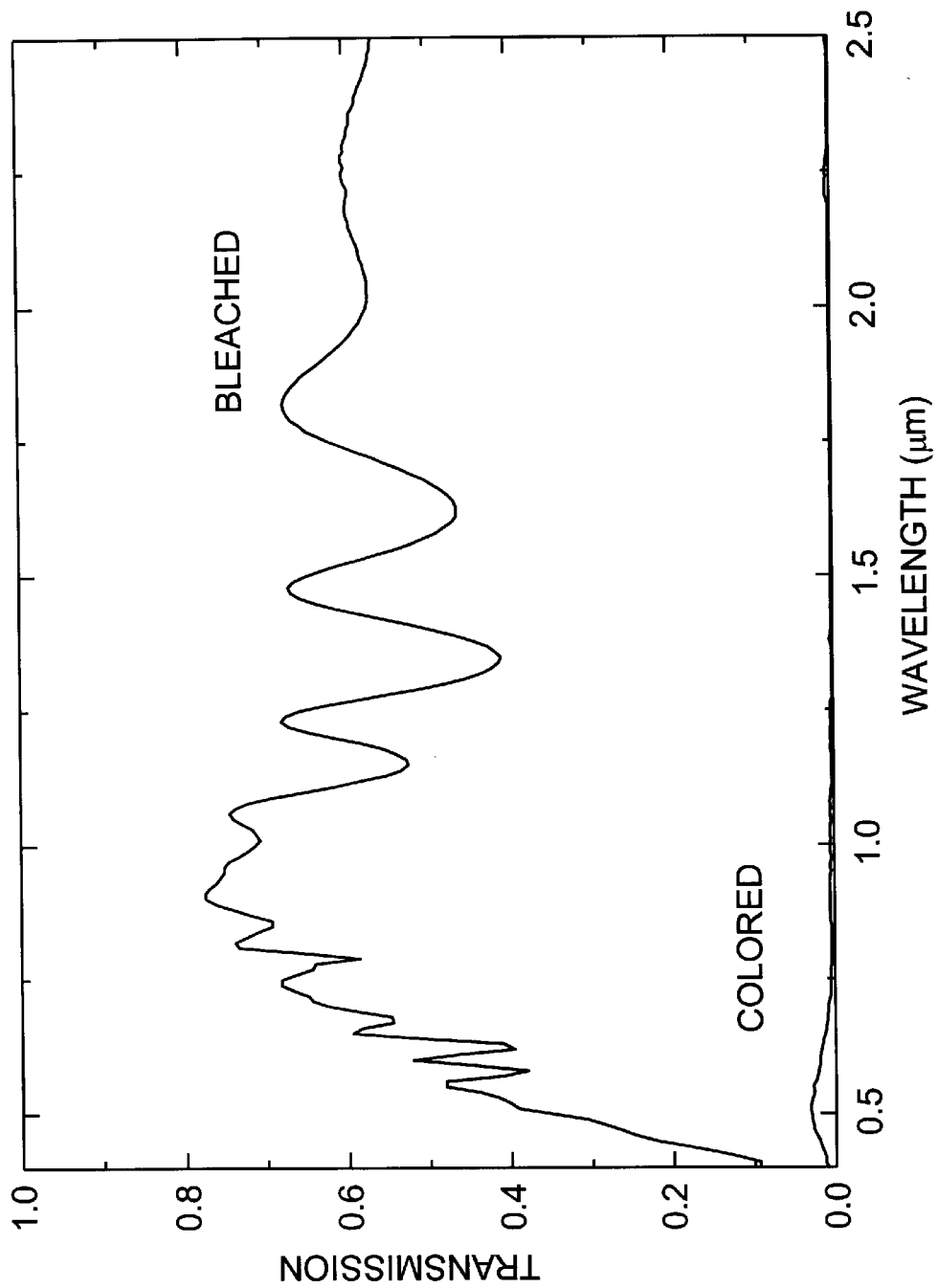
FIGS. 11a–c show typical transmission, reflectivity, and absorption spectra for a device made according to Example 1.
Figure 11B:
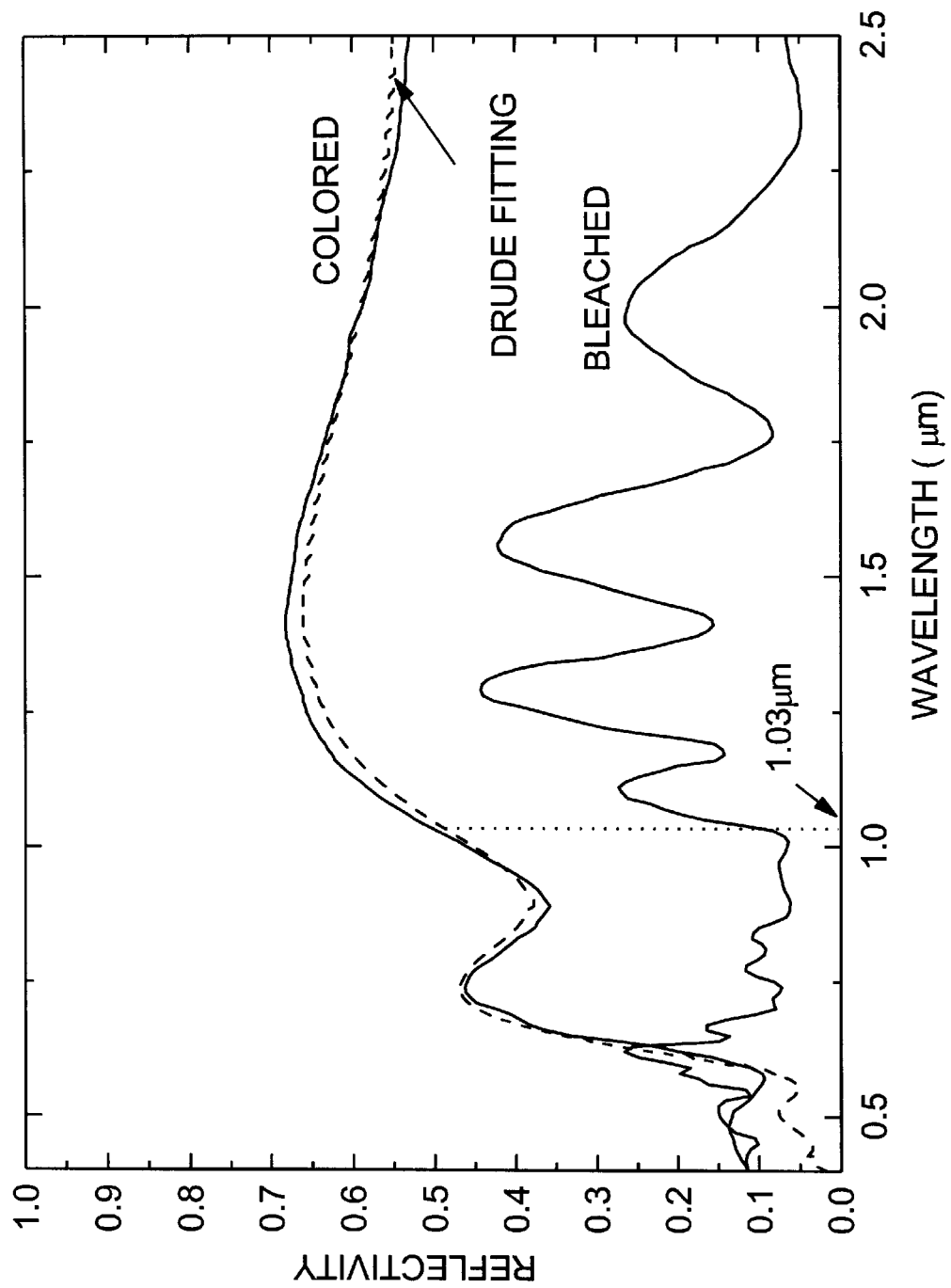
Figure 11C:
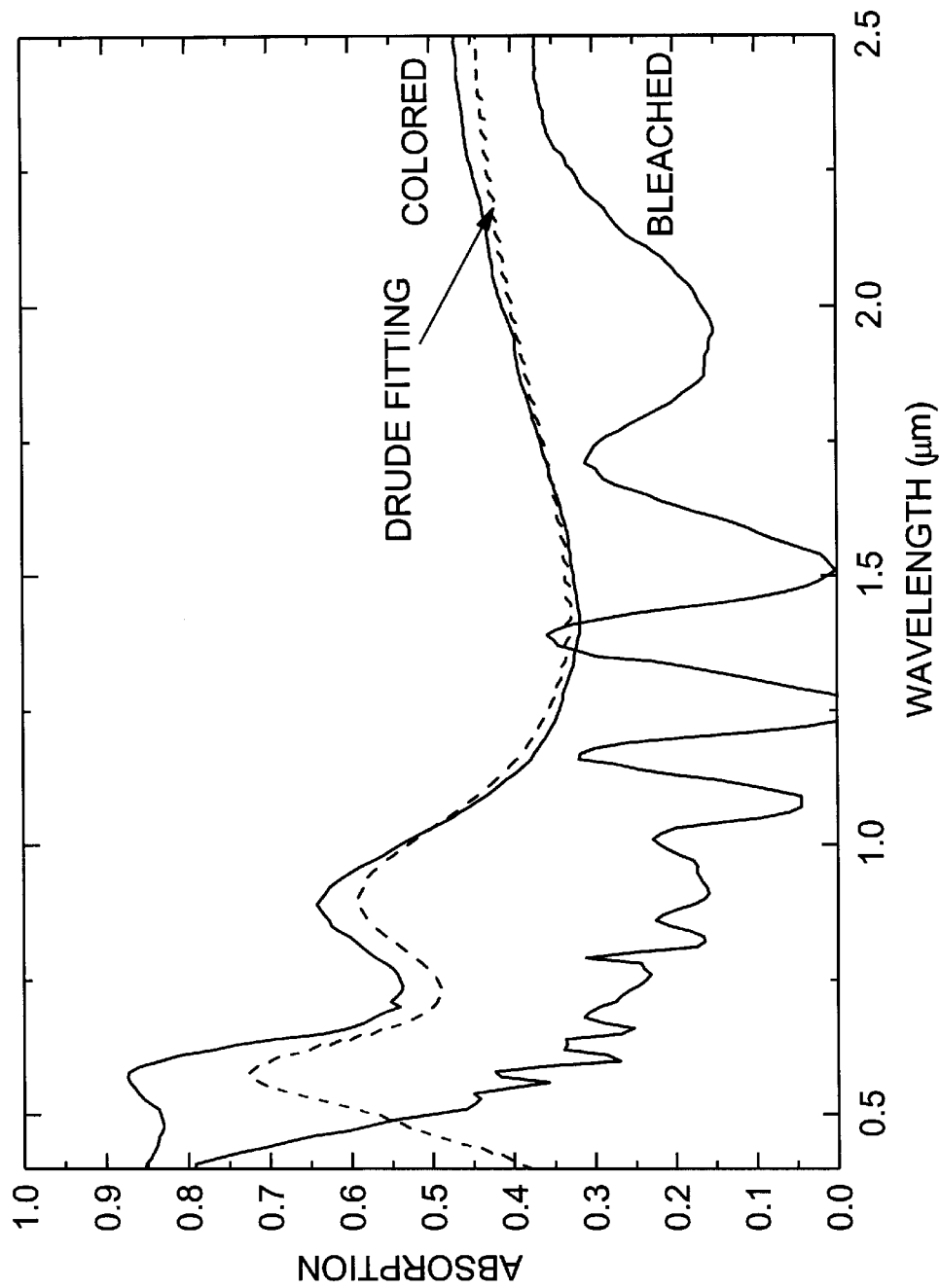

Typical transmission, reflectivity, and absorption spectra for this device are shown in FIGS. 11a–c, respectively. As shown in FIG. 11a, the average bleached state transmissivity for this device is generally about 60% over the spectral range of 0.65 to 2.um. As shown in FIG. 11b, the reflectivity in the colored-state for the near infrared region is generally greater than 50% across the spectrum, approaching 70% as a peak value. As shown in FIG. 11c, the absorptivity in the colored-state for the near infrared region is generally less than 50% across the entire spectrum and less than 40% for most of the near IR region. Both the reflectivity and absorptivity in the bleached-state were less than 40% for most of the visible through near infrared region.

EXAMPLE 2

Five-layer Device(Type II): This device was of the same configuration as the device of Example 1 except that the tungsten oxide anode layer was not sodiated and the ITO layer was 500 Å thick instead of 3000 Å. The device was fabricated using the materials, methods and apparatus of the present invention. A schematic of the individual device layers and corresponding layer thickness is shown in FIG. 12.

Figure 13A:
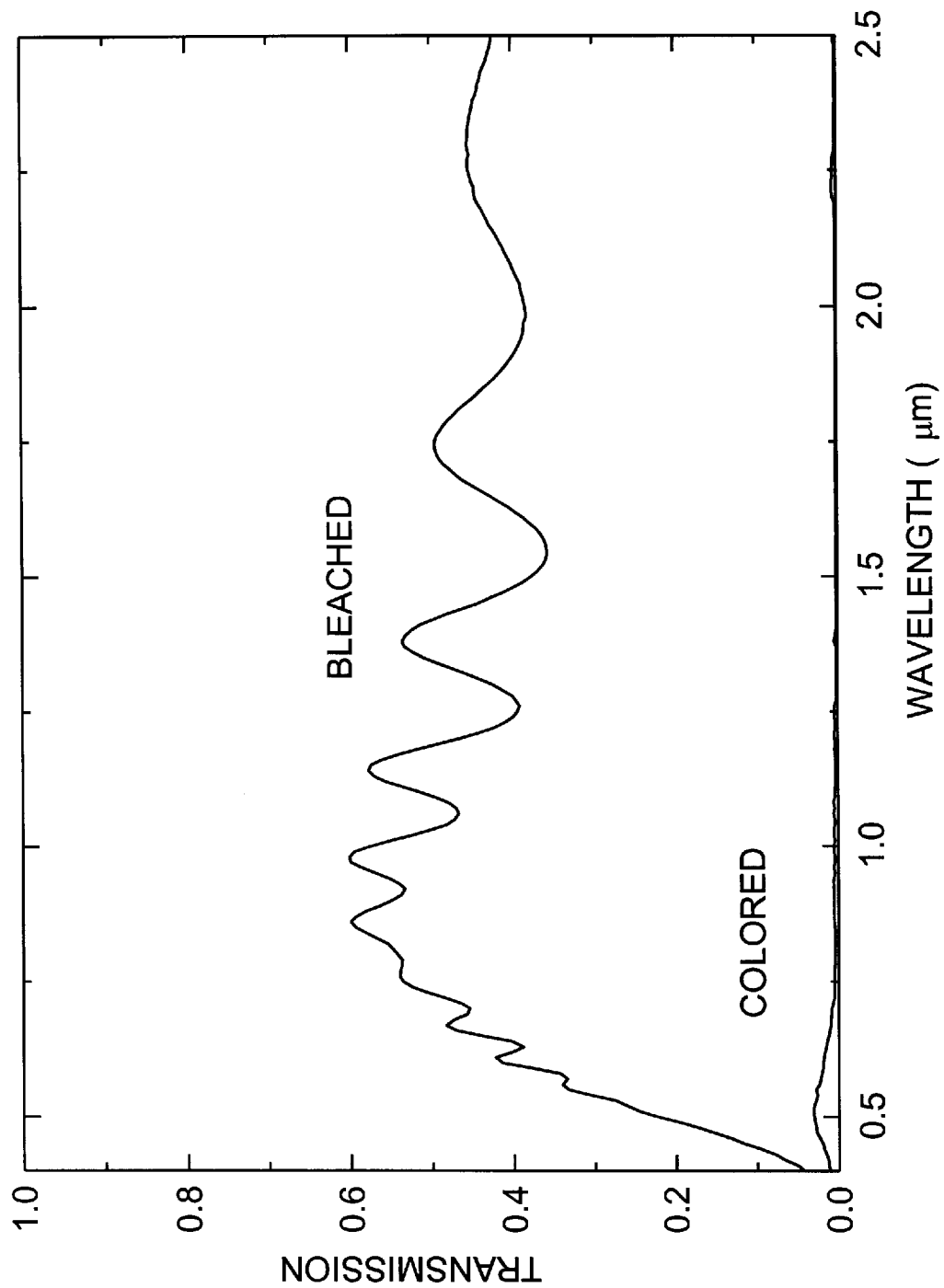
FIGS. 13a–c show typical transmission, reflectivity, and absorption spectra for a device made according to Example 2.
Figure 13B:
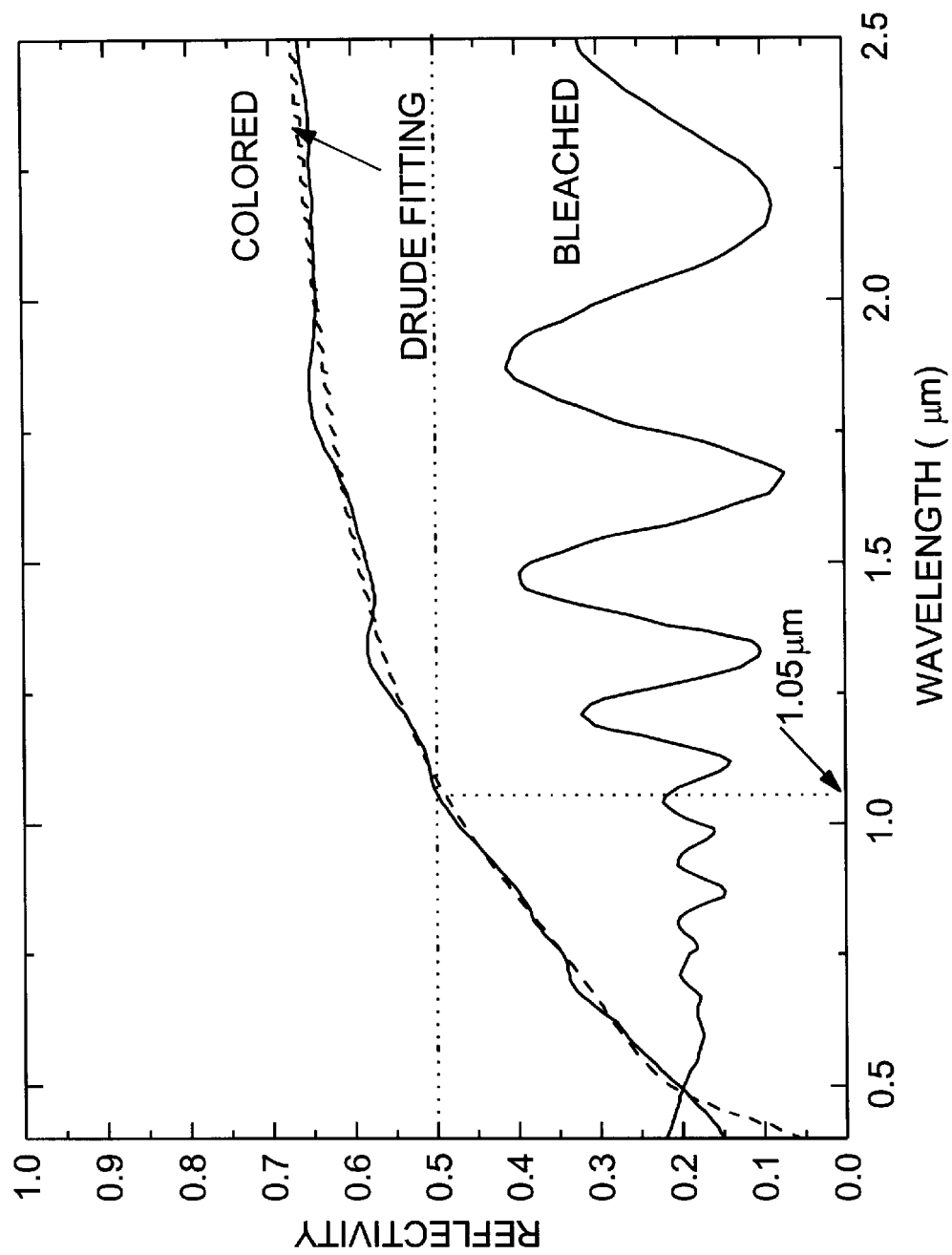
Figure 13C:
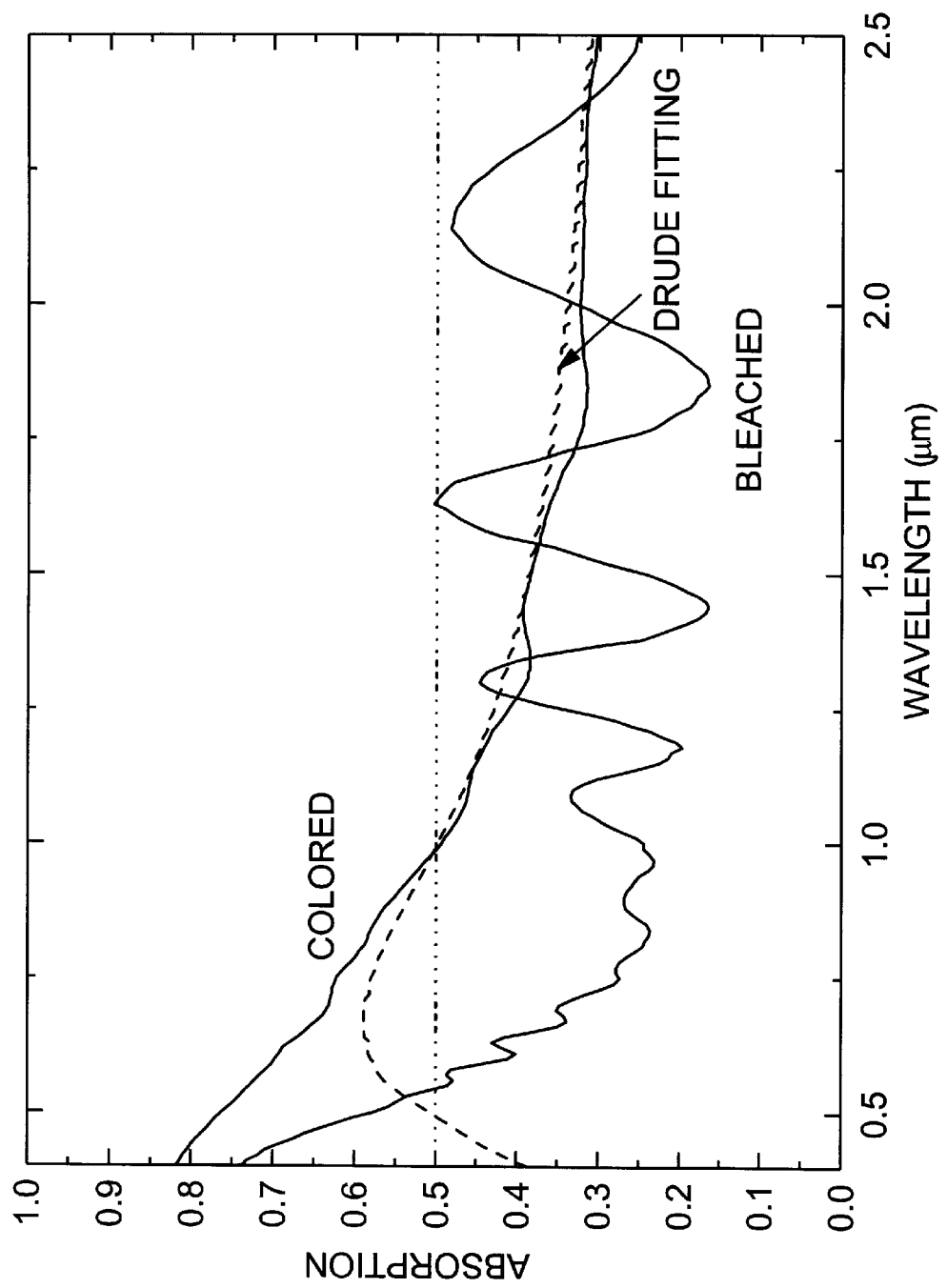

Typical transmission, reflectivity, and absorption spectra for this device are shown in FIGS. 13a–c, respectively. As shown in FIG. 13a, the average bleached state transmissivity for this device is generally about 50% over the spectral range of 0.65 to 1.4 um. As shown in FIG. 13b, the reflectivity in the colored-state for the near infrared region is generally greater than 50% across the spectrum, approaching 65%. As shown in FIG. 13c, the absorptivity in the colored-state for the near infrared region is generally less than 50% across the near infrared spectrum and less than 40% for most of this region. Both the reflectivity and absorptivity in the bleached-state are generally less than 50% for virtually the entire range from visible through near infrared, and less than 40% through most of this range region.

EXAMPLE 3

Figure 14:
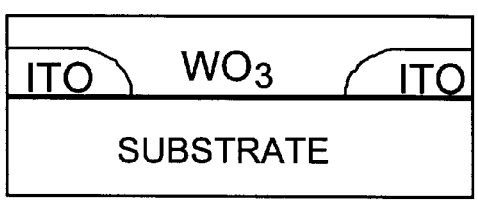
FIG. 14 is a schematic diagram of a the multi-layered device of Example 3.

Four Layer Device (Type I): This device was of a similar configuration as the device of Example 1 except that no silicon nitride sealing layer was employed, the sodiated tungsten oxide anode layer was 1600 Å thick instead of 1500 Å, no silicon carbide ion blocking layer was employed, and rather than providing a continuous ITO conductor layer, two edge strips of ITO were deposited using a conventional mask. The device was fabricated using the materials, methods and apparatus of the present invention. A schematic of the individual device layers, edge contacts, and corresponding layer thickness is shown in FIG. 14.

Figure 15A:
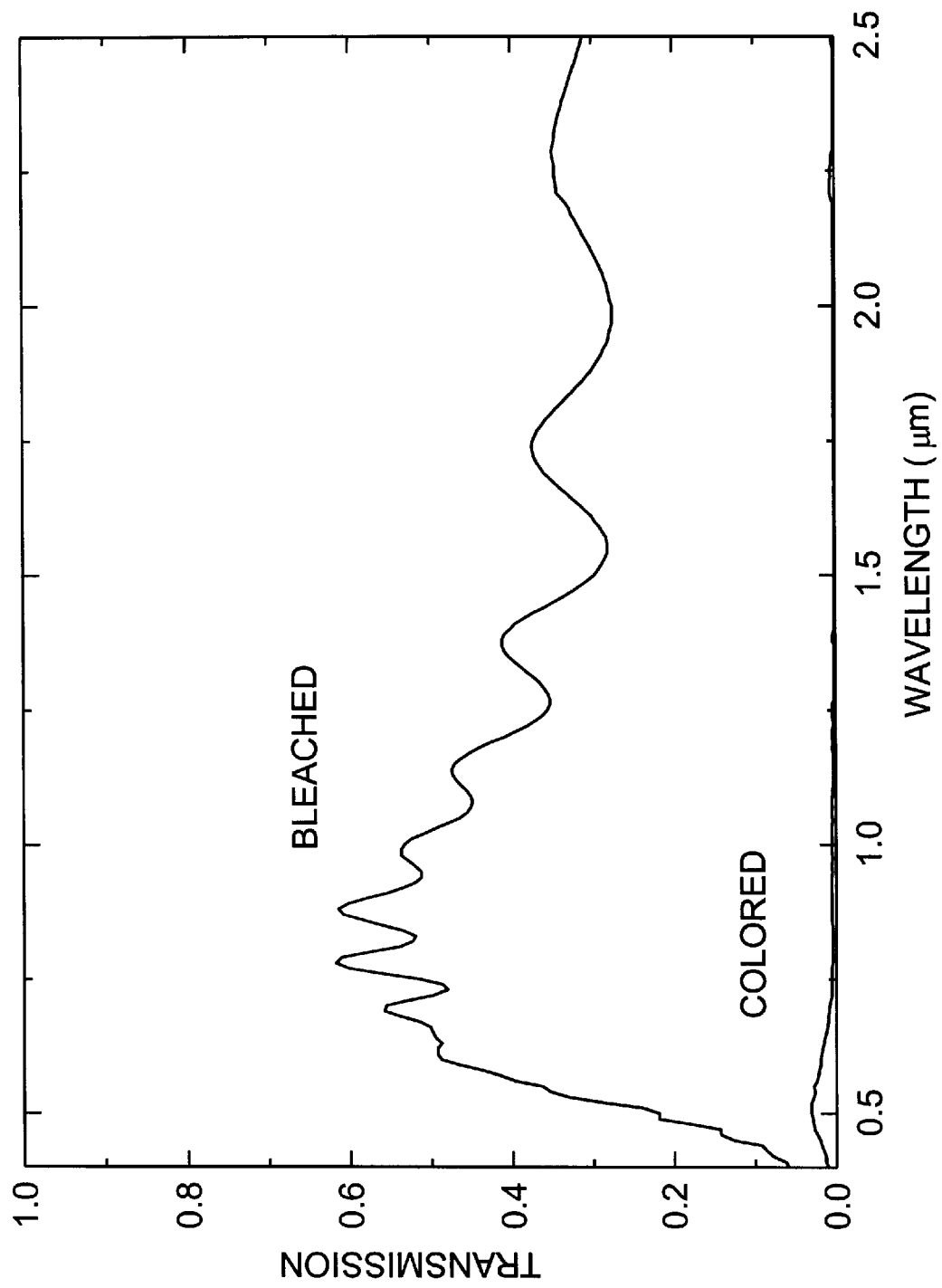
FIGS. 15a–c show typical transmission, reflectivity, and absorption spectra for a device made according to Example 3.
Figure 15B:
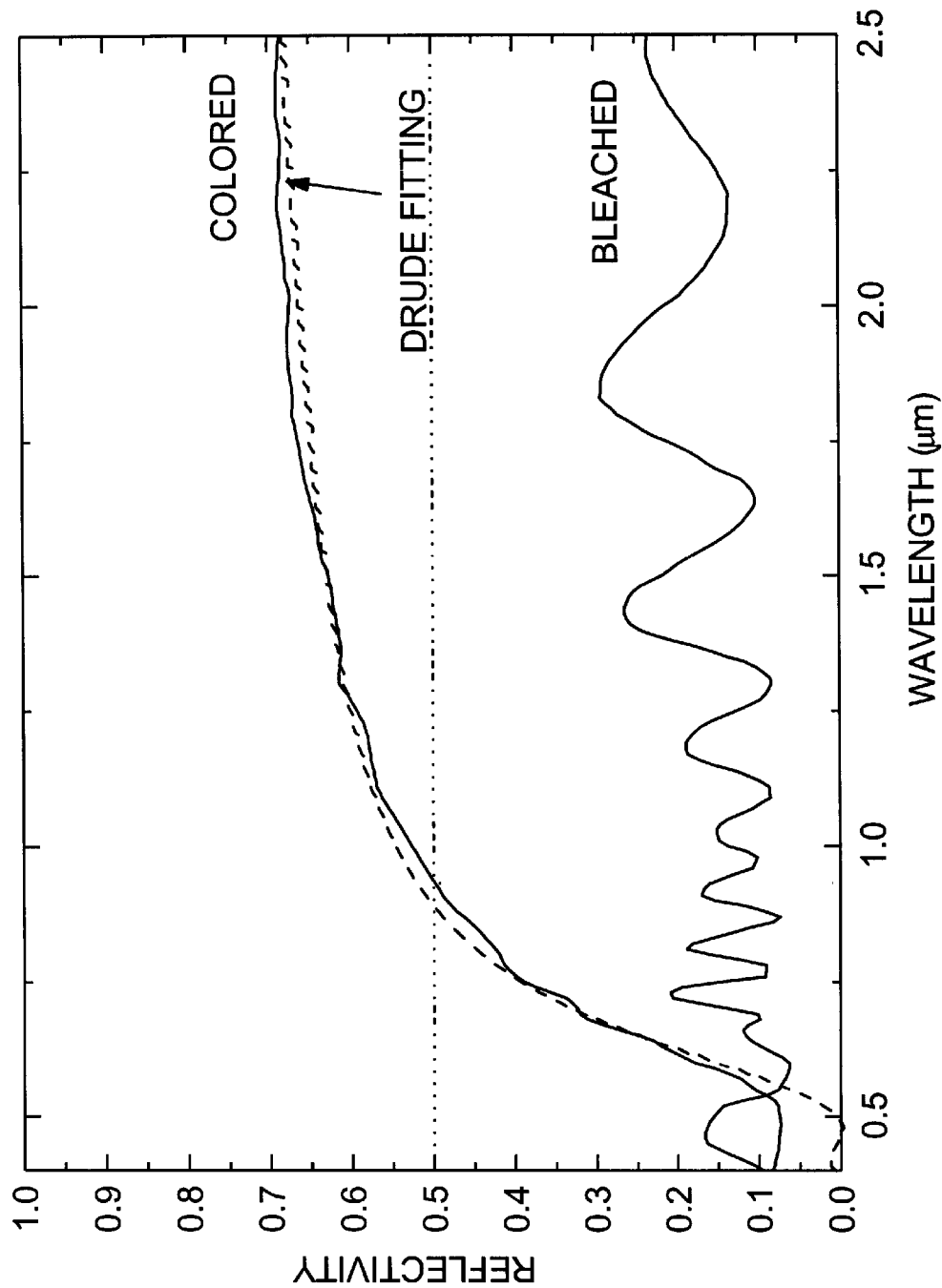
Figure 15C:
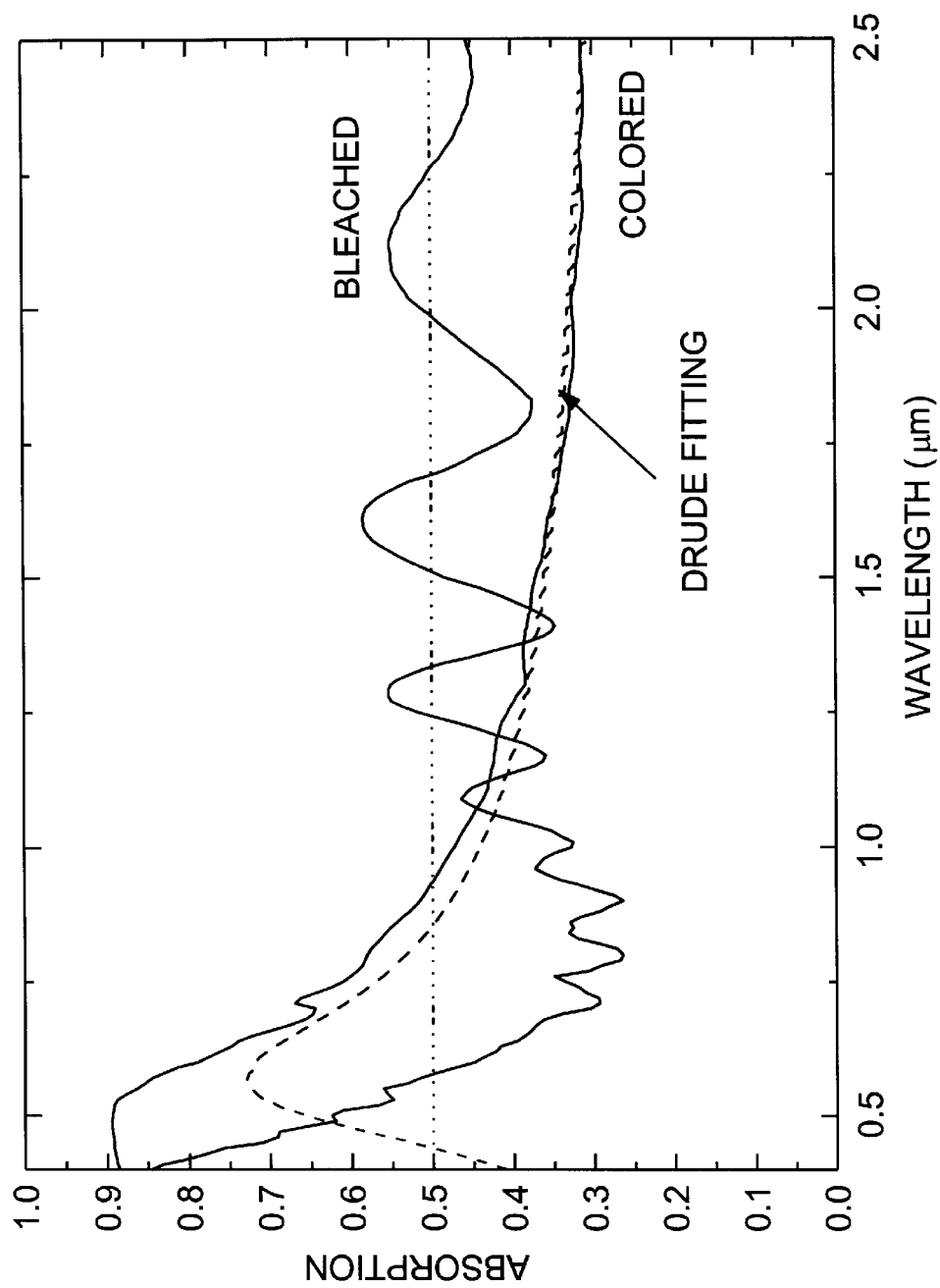

Typical transmission, reflectivity, and absorption spectra for this device are shown in FIGS. 15a–c, respectively. As shown in FIG. 15a, the transmissivity in the bleached state is generally about 50% over the spectral range from 0.65 to 1.0 um and over 30% for the near infrared up to 2.5 um. As shown in FIG. 15b, the reflectivity in the colored-state was generally greater than 50% across the near infrared spectrum, greater than 60% for most of this region, and approaching 70% at longer wavelengths. The reflectivity in the bleached-state was generally less than 30% for the entire spectral range. These reflectivity results are attributed to the elimination of the bottom ITO layer. As shown in FIG. 15c, the absorptivity in the colored-state for the near infrared region was generally less than 50% across the near infrared spectrum and less than 40% for most of this region. The absorptivity in the bleached-state was generally less than 50% from the edge of the visible through the near infrared and less than 40% through most of the near infrared region.

EXAMPLE 4

Four Layer Device (Type II): This device was of a similar configuration as the device of Example 3 except that no titanium nitride ion blocking layer was employed, the indium oxide layer served as the cathode and no $LiCoO_2$ layer was employed, an additional lithiation treatment of the anode layer was used to provide additional lithium for insertion in the indium oxide layer, the thickness of the LiPON electrolyte layer was 19000 Å thick instead of 15000 Å, the tungsten oxide anode layer was not sodiated and was 1700±100 Å thick instead of 1600 Å, a 200 Å thick silicon carbide ion blocking layer was used with the tungsten oxide anode, and a 2500 Å thick continuous ITO conductor layer was employed rather than the two ITO edge strips. The device was fabricated using the materials, methods and apparatus of the present invention. A schematic of the individual device layers, edge contacts, and corresponding layer thickness is shown in FIG. 16.

Figure 17A:
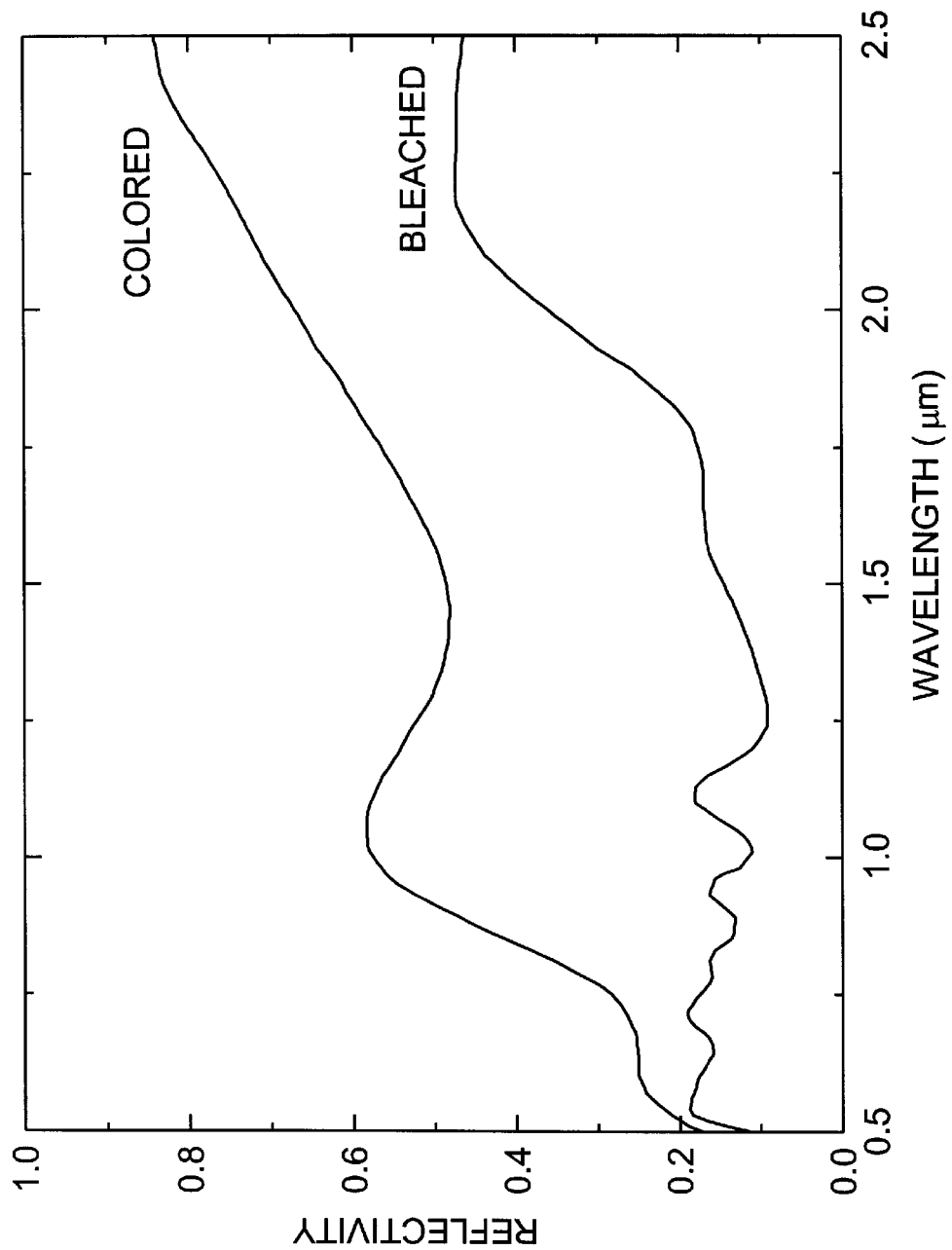
FIGS. 17a–b show typical reflectivity and transmission spectra for a device made according to Example 4.
Figure 17B:
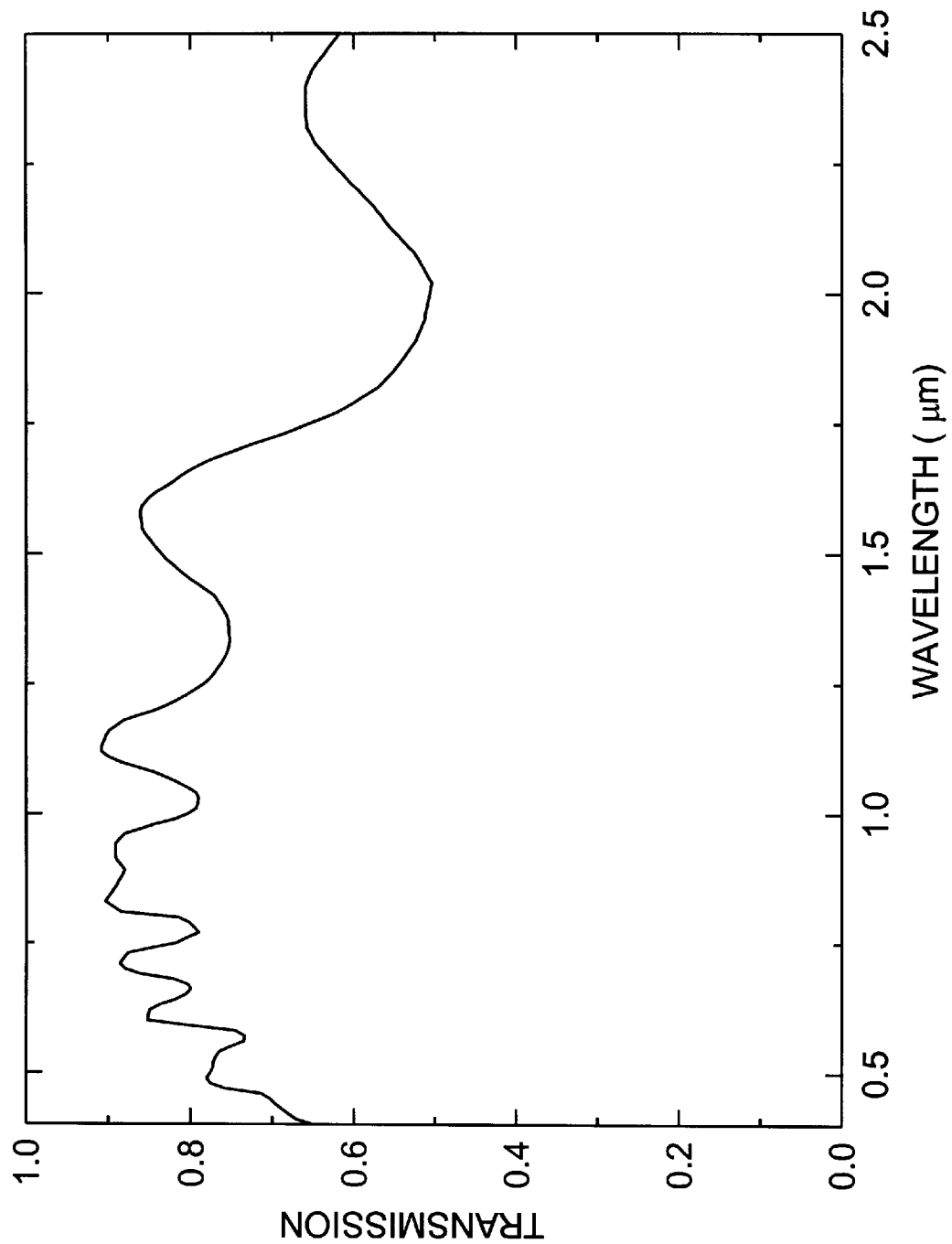

A typical reflectivity spectra in both the colored and bleached states for this device is shown in FIG. 17a. As shown in FIG. 17a, the average colored state reflectivity is generally greater than 50% across most of the measured spectrum and greater than 60% for most of near infrared region, approaching 80% at longer wavelengths. The reflectivity in the bleached-state is generally less than 20% throughout the visible and into the near infrared range. These reflectivity results are attributed to the substitution of lithiated ITO for $LiCoO_2$ as the cathode layer. In FIG. 17b, a typical bleached state transmissivity spectra is shown for this device after deposition of the LiPON layer and prior to deposition of the second $In_2O_3$ transparent conductor layer. As shown in FIG. 17b, the average transmission of the device is generally greater than 80% throughout the visible and into the near infrared and greater than 50% throughout the entire measured spectral region.

Having described the preferred embodiments of the invention, it will now become apparent to one of skill in the art that other embodiments incorporating the concepts may be used. Therefore, it is not intended to limit the invention to the disclosed embodiments but rather the invention should be limited only by the spirit and scope of the following claims.

What is claimed is:

1. A multi-layered electrochromic device having a high reflectivity modulation, a high transmissivity modulation, and a low absorptivity comprising:

a transparent substrate;

a first thin film electrochromic electrode, said first electrode capable of receiving, storing and delivering cations and electrons to be transported to a second thin film electrochromic electrode for reversible transformation of said device into an optically transparent state, said second thin film electrochromic electrode capable of receiving, storing and delivering cations and electrons to be transported to said first electrode for reversible transformation of said device into an optically reflective state;

a thin film, inorganic, solid-state, amorphous electrolyte disposed between said first and said second electrodes, said electrolyte comprising a mixed compound of lithium, oxygen and at least one element selected from the group consisting of phosphorus, nitrogen, aluminum, titanium, tantalum and niobium, said electrolyte formed by i) thermally evaporating onto a surface of said first electrode a material having a composition which comprises at least one first component of said electrolyte, and ii) simultaneously and concurrently exposing said first electrode surface and said thermally evaporated material to at least one source of energetic ions, said at least one ion source having an ion beam energy of less than 100 eV, said at least one ion source having an elemental ion composition which comprises at least one second component of said electrolyte, wherein said energetic ions and said thermally evaporated material combine to form said thin film of said electrolyte;

said electrolyte having an ionic conductivity of at least $1\times10^{-6}$ S/cm and an electronic resistivity greater than $10^{13}$ ohm·cm, said electrolyte capable of conveying a plurality of cations to said first and second electrodes, said cations conveyed to said first electrode for reversibly transforming at least one of said first and second electrodes into said optically reflective state, said cations conveyed to said second electrode for reversibly transforming at least one of said first and second electrodes into said optically transparent state, whereby, upon application of a predetermined voltage or current of a first polarity across said first and second electrodes, said cations and said electrons are inserted into said first electrode and, upon application of a predetermined voltage or current of a second polarity across said first and second electrodes, said cations and said electrons are extracted from said first electrode; and said device having an optical absorptivity of less than 50% at a plurality of wavelengths in both said optically transparent and said optically reflective states, said device having a transmissivity modulation of at least 50% and a reflectivity modulation of at least 40% at a plurality of wavelengths when said device is reversibly transformed between said optically transparent and said optically reflective states.

2. The electrochromic device of claim 1 wherein said absorptivity is less than 40% at a plurality of wavelengths in both said optically transparent and said optically reflective states and said transmissivity modulation is at least 60% and said reflectivity modulation is at least 50% at a plurality of wavelengths when said device is reversibly transformed between said optically transparent and said optically reflective states.

3. The electrochromic device of claim 1 wherein said absorptivity is less than 30% at a plurality of wavelengths in both optically transparent and said optically reflective states and said transmissivity modulation is at least 70% and said reflectivity modulation is at least 60% at a plurality of wavelengths when said device is reversibly transformed between said optically transparent and said optically reflective states.

4. The electrochromic device of claim 1 wherein said first and second electrodes are each formed by i) thermally evaporating onto a surface of one layer of said multi-layer electrochromic device a material having a composition which comprises at least one first component of said electrode, and ii) simultaneously and concurrently exposing said layer surface and said thermally evaporated material to at least one source of energetic ions, said at least one ion source having an ion beam energy of less than 100 eV, said at least one ion source having an elemental ion composition which comprises at least one second component of said electrode, wherein said energetic ions and said thermally evaporated material combine to form a thin film of said electrode on said layer surface.

5. The electrochromic device of claim 1 wherein said first electrode is comprised of tungsten oxide.

6. The electrochromic device of claim 1 wherein said second electrode is comprised of a material selected from the group consisting of lithiated metal oxides and lithiated mixed metal oxides of cobalt, nickel, chromium, vanadium, titanium tin, indium, and tin oxide amorphous glass.

7. The electrochromic device of claim 1 wherein the electrolyte is comprised of a material selected from the group consisting of lithium phosphorus oxynitride, lithium niobate, lithium aluminum silicate and lithium silicon oxynitride.

8. The electrochromic device of claim 1 wherein said first electrode is comprised of tungsten oxide, said second electrode is comprised of lithium cobalt oxide, and said electrolyte is comprised of lithium phosphorus oxynitride.

9. The electrochromic device of claim 1 further comprising:

a first transparent electronically conductive layer deposited on said substrate prior to deposition of said first electrode, said first conductive layer disposed between said substrate and said first electrode; and a second transparent electronically conductive layer deposited on said second electrode, said first and second conductive layers adaptively configured and capable of being connected to a voltage and current source;

whereby, upon application of a predetermined voltage or current of a first polarity across said first and second conductive layers, said cations and said electrons are inserted into said first electrode and, upon application of a predetermined voltage or current of a second polarity across said first and second conductive layers, said cations and said electrons are extracted from said first electrode.

10. The electrochromic device of claim 9 wherein said first and second transparent conductors are selected from the group consisting of indium oxide and indium tin oxide.

11. The electrochromic device of claim 9 further comprising an optically transparent electronically conductive ion blocking layer, said ion blocking layer disposed between said first transparent conductor and said first electrode.

12. The electrochromic device of claim 11 wherein said ion blocking layer is selected from the group consisting of silicon carbide, and a metal nitride or mixed metal nitride of titanium, zirconium, hafnium and a transition metal.

13. The electrochromic device of claim 9 further comprising an optically transparent, electronically conductive ohmic contact layer, said ohmic contact layer disposed between said second electrode layer and said second transparent conductor.

14. The electrochromic device of claim 13 wherein said ohmic contact layer is selected from the group consisting of a metal nitride or mixed metal nitride of titanium, zirconium, hafnium and a transition metal.

15. The electrochromic device of claim 9 further comprising:

an optically transparent electronically conductive ion blocking layer, said ion blocking layer disposed between said first transparent conductor and said first electrode layer; and an optically transparent, electronically conductive ohmic contact layer, said ohmic contact layer disposed between said second electrode layer and said second transparent conductor.

16. The electrochromic device of claim 15 wherein said transparent ion blocking layer is comprised of silicon carbide and said transparent ohmic contact layer is comprised of titanium nitride.

17. The electrochromic device of claim 9 further comprising an optically transparent impervious sealant layer deposited on said second transparent conductor layer, said sealant layer acting as a barrier to atmospheric oxygen and humidity.

18. The electrochromic device of claim 17 wherein said sealant layer is selected from the group consisting of silicon nitride, a metal, a glass, a ceramic, a thermosetting polymer, and a thermoplastic polymer.

19. A method for rapid uniform switching of the electrochromic device of claim 1 between an optically reflective colored state and an optically transparent bleached state comprising the steps of:

applying a first voltage across a first transparent conducting layer of said device with a first voltage source;

applying a second voltage across a second transparent conducting layer of said device with a second voltage source;

providing a common electrical reference potential for said first and second voltage sources, said common reference potential applied at a first edge of said first conducting layer and at an opposing edge of said second conducting layer; wherein a linear electrical potential drop is produced across said device from said first edge to said opposing edge resulting in a uniformly distributed potential difference across said device.

20. A low temperature deposition method for making a dense, thin film, amorphous electrochromic device electrolyte having a high decomposition potential, a high ionic conductivity and high electronic resistivity comprising the steps of:

thermally evaporating onto an electrode surface a material having a composition which comprises at least one first component of said electrolyte;

simultaneously and concurrently exposing said electrode surface and said thermally evaporated material to at least one source of energetic ions, said at least one ion source having an ion beam energy of less than 100 eV, said at least one ion source having an elemental ion composition which comprises at least one second component of said electrolyte; and combining said energetic ions and said thermally evaporated material to form said electrolyte film on said electrode surface, said electrolyte having an ionic conductivity of at least $1 \times 10^{-6}$ S/cm and an electronic resistivity greater than $10^{13}$ ohm·cm, said electrolyte having a decomposition potential of at least 6 volts.

21. The method of claim 20 wherein the electrolyte is comprised of a material selected from the group consisting of lithium phosphorus oxynitride, lithium niobate, lithium aluminum silicate and lithium silicon oxynitride.

22. A low temperature deposition method for making a dense, thin film electrochromic electrode comprising the steps of:

thermally evaporating onto a surface of one layer of a multi-layer electrochromic device a material having a composition which comprises at least one first component of said electrode;

simultaneously and concurrently exposing said layer surface and said thermally evaporated material to at least one source of energetic ions, said at least one ion source having an ion beam energy of less than 100 eV, said at least one ion source having an elemental ion composition which comprises at least one second component of said electrode; and combining said energetic ions and said thermally evaporated material to form said electrode film on said layer surface.

23. The method of claim 22 wherein the electrode is comprised of a material selected from the group consisting of tungsten oxide and lithiated metal oxides and mixed metal oxides of cobalt, nickel, chromium, vanadium, titanium, tin, indium, and tin oxide amorphous glass.

* * * * *